US007392692B2

(12) United States Patent  
Noda

(10) Patent No.: US 7,392,692 B2
(45) Date of Patent: Jul. 1, 2008

(54) SURFACE SCAN MEASURING DEVICE, SURFACE SCAN MEASURING METHOD, SURFACE SCAN MEASURING PROGRAM AND RECORDING MEDIUM

(75) Inventor: Takashi Noda, Utsunomiya (JP)

(73) Assignee: Mitutoyo Corporation, Kawasaki-shi (JP)

( * ) Notice: Subject to any disclaimer, the term of this patent is extended or adjusted under 35 U.S.C. 154(b) by 337 days.

(21) Appl. No.: 11/138,183

(22) Filed: May 26, 2005

(65) Prior Publication Data

US 2005/0263727 A1    Dec. 1, 2005

(30) Foreign Application Priority Data

May 31, 2004    (JP)    ............................. 2004-161607

(51) Int. Cl.
 G01B 5/28    (2006.01)
 G01B 5/20    (2006.01)
(52) U.S. Cl. .............................. 73/105; 73/104; 33/503; 33/504; 33/505; 33/551; 33/556; 33/559
(58) Field of Classification Search .................. 73/104, 73/105; 33/503, 504, 505, 551, 556, 559
See application file for complete search history.

(56) References Cited

U.S. PATENT DOCUMENTS

| 5,140,239 A | 8/1992 | Matsuura |
| 5,334,918 A | 8/1994 | McMurtry et al. |
| 5,737,244 A | 4/1998 | Ruck |
| 6,158,136 A | 12/2000 | Gotz et al. |

FOREIGN PATENT DOCUMENTS

| JP | 5-248852 | 9/1993 |
| JP | 8-178646 | 7/1996 |
| JP | 2000-039302 | 2/2000 |
| JP | 2003-202219 | 7/2003 |

*Primary Examiner*—Daniel S Larkin
(74) *Attorney, Agent, or Firm*—Rankin, Hill & Clark LLP

(57) ABSTRACT

A surface scan measuring device, a surface scan measuring method, a surface scan measuring program and a recording medium storing such a program which can appropriately adjust the scanning speed, the sampling pitch and other measurement parameters according to the surface condition of a workpiece are provided. The surface scan measuring device includes a radius of curvature computing section (543) for computing the radius of curvature of the scanning point from the measurement data acquired during the ongoing scanning operation, a moving speed deciding section (544) for deciding the moving speed of the scanning probe according to the computed radius of curvature and a sampling pitch deciding section (546) for deciding the sampling pitch according to the computed radius of curvature.

8 Claims, 24 Drawing Sheets

SURFACE SCAN MEASURING DEVICE, SURFACE SCAN MEASURING METHOD, SURFACE SCAN MEASURING PROGRAM AND RECORDING MEDIUM

BACKGROUND OF THE INVENTION

1. Field of the Invention

The present invention relates to a surface scan measuring device, a surface scan measuring method, a surface scan measuring program, and a recording medium. More specifically, the present invention relates to, for example, a surface scan measuring device for measuring the form of the surface of a workpiece along with the roughness, the waviness, the contour and other surface texture of the workpiece,

2. Description of Related Art

Conventionally, a roughness measuring machine, a contour measuring machine, a roundness measuring machine, a coordinate measuring machine and the like are known as a measuring machine for measuring the surface texture and the three-dimensional profile of a workpiece by scanning the surface of the workpiece with a scanning probe (see, for example, Patent Document 1: Japanese Patent Application Laid-Open No. Hei. 5-248852, Patent Document 2: Japanese Patent Laid-Open Publication No. Hei. 8-178646, Patent Document 3: Japanese Patent Laid-Open Publication No. 2000-39302, and Patent Document 4: Japanese Patent Laid-Open Publication No. 2003-202219).

For example, a known measuring system that utilizes a coordinate measuring machine is configured so as to include a coordinate measuring machine adapted to move a scanning probe, a joystick to be operated manually, a motion controller for controlling the operation of the coordinate measuring machine and a host computer for operating the coordinate measuring machine by way of the motion controller and processing the measurement data acquired by the coordinate measuring machine to determine the dimensions and the form of a workpiece. The moving speed of the scanning probe and the sampling pitch of the measurement data and other necessary parameters are defined and input to the host computer in advance.

With the above-described arrangement, the scanning probe scans the surface of the workpiece at the preset moving speed to acquire measurement data at a preset sampling pitch under the control of the motion controller and the host computer. The form of the workpiece is analyzed on the basis of the measurement data.

However, when the moving speed for moving the scanning probe and the sampling pitch for acquiring measurement data are fixed to predefined respective values, there arises a problem that the moving speed and the sampling pitch can be inadequate for scanning the surface of the workpiece depending on the surface condition of the workpiece. For example, if the surface of the workpiece shows undulations only to a small extent and the scanning speed is fixed to a low value, it will take an unnecessarily long time for the surface measurement. Conversely, if the surface of the workpiece shows undulations to a large extent and the scanning speed is fixed to a high value, there may arise errors such as excessive push-in and breakaway. Additionally, excessive data can be acquired if the surface of the workpiece shows undulations to a small extent and data are collected at a fixed sampling pitch, whereas the acquired data may be insufficient for measuring the surface if the surface of the workpiece shows undulations to a large extent and data are acquired at a preset and fixed sampling pitch.

SUMMARY OF THE INVENTION

A principal object of the present invention is to provide a surface scan measuring device, a surface scan measuring method, a surface scan measuring program, and a recording medium storing such a program that can appropriately adjust the scanning speed, the sampling pitch and other measurement parameters according to the surface condition of the workpiece so as to reduce the necessary measuring time and/or improve the accuracy of measurement.

A surface scan measuring device according to an aspect of the present invention includes: a scanning probe having a detecting section for detecting the relative position of itself relative to the surface of a workpiece along a normal line direction of the surface of the workpiece and adapted to scan the surface of the workpiece in a condition where the relative position of the detecting section relative to the surface of the workpiece is maintained within a predetermined range centered at a predefined reference position; a moving section for moving the scanning probe; a measurement data storage section for sampling the output of the detecting section and the drive quantity of the moving section at a predetermined sampling pitch and storing the sampled data as measurement data; a measurement condition deciding section including a surface condition determining section for determining the surface condition of the workpiece according to the measurement data and adapted to decide, according to the determined surface condition, the adaptive measurement control condition by determining or adjusting at least one of measurement parameters, which include the moving speed for moving the scanning probe and the sampling pitch, and control parameters, which include the control gain; a scanning vector commanding section for commanding the scanning vector for moving the scanning probe according to the moving speed; and a drive control section for driving and controlling the moving section according to the scanning vector and the control parameters.

With the above-described arrangement, the surface condition of the workpiece is determined by the surface condition determining section so that, for example, the extent of undulations of the surface of the workpiece is determined.

Then, the measurement parameters and the control parameters for controlling the scan measuring operation are determined or adjusted appropriately according to the surface condition of the workpiece.

The measurement parameters may include the sampling pitch for acquiring the moving speed for moving the scanning probe and the measurement data at predetermined time intervals or predetermined distance intervals and other parameters. The control parameters may include scanning control parameters and servo control parameters, of which the scanning control parameters may include the scanning control gain for determining the tracking ability for scanning control when the scanning vector commanding section generates the scanning vector and the servo control parameters may include servo control gains such as a position loop gain and a speed loop gain for the servo control loop of the drive control section and a phase compensation element such as a phase lead or a phase lag and a feed forward compensation element.

For instance, if the surface of the workpiece shows undulations to a large extent, the standard moving speed determined at the time of starting the measurement or the moving speed adjusted thereafter is adjusted to a lower speed. If, to the contrary, the surface of the workpiece shows undulations to a small extent, the moving speed is adjusted to a higher speed. When the moving speed of the scanning probe is determined or adjusted according to the condition of the workpiece in this way, errors such as excessive push-in and breakaway from the surface of the workpiece of the scanning probe hardly occur if the surface of the workpiece shows undulations to a large extent. Conversely, the scanning probe is moved at high speed to remarkably reduce the time required for the surface measurement if the workpiece shows undulations only to a small extent.

Additionally, the standard sampling pitch determined at the time of starting the measurement or the sampling pitch adjusted thereafter is adjusted to a narrower pitch if the surface of the workpiece shows undulations to a large extent, whereas the sampling pitch is adjusted to a broader pitch if the surface of the workpiece shows undulations only to a small extent. Thus, a situation where the form of the workpiece cannot be analyzed accurately because of too scarce measurement data can be avoided when the sampling pitch is determined or adjusted according to the surface condition of the workpiece in this way. Additionally, there is no risk of acquiring measurement data excessively and hence it is possible to carry out a scan measuring operation within an appropriate time period. In other words, the time required for the scan measuring operation is reduced.

The sampling pitch may be defined either in terms of predetermined distance intervals or in terms of predetermined time intervals of movement of the scanning probe. Either of them may be arbitrarily selected and subsequently altered according to the surface condition of the workpiece and the results of analysis of the measurement data.

Furthermore, the servo control gain determined at the time of starting the measurement or the servo control gain adjusted thereafter is adjusted to a higher gain when the surface of the workpiece shows undulations to a large extent, whereas the servo control gain is adjusted to a lower gain when the surface of the workpiece shows undulations only to a small extent. Thus, when the servo control gain is determined or adjusted according to the condition of the workpiece in this way, errors such as excessive push-in and breakaway from the surface of the workpiece of the scanning probe hardly occur because the tracing performance of the drive control section is improved if the surface of the workpiece shows undulations to a large extent. Conversely, the stability of the drive control section is improved to by turn remarkably improve the accuracy of the sampled measurement data if the workpiece shows undulations only to a small extent.

The scanning vector commanding section may either autonomously generate a scanning vector and specify it or generate a track scanning vector according to the track (predetermined route) generated according to the form data that are input in advance and specify it. When the moving speed is decided by the measurement condition deciding section, the scanning vector commanding section generates a scanning vector for moving the scanning probe at the moving speed decided by the measurement condition deciding section. When the scanning control gain is determined or adjusted according to the surface condition of the workpiece at the time of generating the scanning vector, the tracing performance for scanning control is improved and hence errors such as excessive push-in and breakaway from the surface of the workpiece of the scanning probe hardly occur if the surface of the workpiece shows undulations to a large extent whereas the stability of scanning control is improved and hence the accuracy of the sampled measurement data is improved if the surface of the workpiece shows undulations only to a small extent.

The scanning probe may be either of the type having a measuring element to be held in contact with the surface of the workpiece and a detection sensor for detecting the state of contact (extent of push-in or the like) of the measuring element or of the non-contact type having a measuring element to be held away from the surface of the workpiece and a detection sensor for detecting the distance between the measuring element and the surface of the workpiece. For detecting the distance between the measuring element and the surface of the workpiece, the measuring element may be realized by an electrode plate that can operate as a static capacitance detecting type measuring element for detecting the static capacitance of the capacitor formed by the electrode plate of the measuring element and the surface of the workpiece.

If a plurality of moving sections are provided for the three directions of orthogonal three axes, servo control parameters may be determined or adjusted for each of the axes or servo control parameters may be determined or adjusted commonly for all the axes.

If a plurality of parameters are provided as scanning control parameters for the direction of height, for the push-in direction and so on, the parameters may be determined or adjusted individually or all the parameters may be commonly determined or adjusted.

Since the scanning probe is controlled appropriately on the adaptive measurement control condition in this way, it is possible to carry out a scan measuring operation stably and at high speed.

While servo refers to a closed loop control by means of feedback of a position or an angle in a narrow sense, it does not necessarily refer to the closed loop control for the purpose of the present invention. In other words, it may refer to an open loop control typically using a pulse motor without giving rise to any problem for the purpose of the present invention. Therefore, parameters of a system adapted to position control of a predetermined level of accuracy are referred to as servo control parameters.

For the purpose of the present invention, preferably, the surface condition refers to at least the surface direction changing rate, the radius of curvature, the roughness or the waviness of the surface of the workpiece along the moving direction of the scanning probe, The expression of the surface direction changing rate as used herein refers to the changing rate of the angle of the moving direction of the scanning probe when the scanning probe is moving along the surface direction of the workpiece downward (with a negative angle) on a recess of the surface of the workpiece or upward (with a positive angle) on a projection. Examples of spots where the surface direction changing rate shows a large value include an edge section (acutely angled section) of the workpiece, whereas examples of spots where the surface direction changing rate shows a small value include a flat section of the workpiece. In a special case where the surface direction changes continuously in an angular sense, the scanning probe assumes that the surface of the workpiece is a curved surface and determines the radius of curvature thereof so that the surface condition of the workpiece can be represented by the radius of curvature.

When the surface condition of the workpiece is represented by the surface texture such as roughness and waviness, various roughness/waviness parameters used for roughness and waviness can be used for the purpose of the present invention.

With the above-described arrangement, the radius of curvature is computationally determined according to the measurement data and the like that have already been acquired. Then, the extent of curvature of the surface of the workpiece is judged on the basis of the determined radius of curvature and then, the moving speed, for instance, is determined or adjusted according to the radius of curvature.

When the moving speed of the scanning probe is continuously adjusted on the basis of the radius of curvature at the current scanning spot, the moving speed will be always appropriate and hence errors such as excessive push-in and breakaway from the surface of the workpiece hardly occur. Additionally, the scanning probe can move at high speed where the surface of the workpiece is curved to a small extent and hence the scanning operation can be performed in a short time.

Preferably, the measurement parameters such as the moving speed and the sampling pitch, the control parameters such as the servo control gain and the scanning control gain and other parameters are stored in respective reference tables that store their correspondences relative to the surface condition. For example, it is preferable that a moving speed reference table defines the relationship between the radius of curvature and the moving speed, such as the smaller the radius of curvature, the slower the moving speed and, the larger the radius of curvature, the grater the moving speed. With this arrangement, it is possible to determine or adjust the measurement parameters and the servo control parameters on the basis of the outcome of the judgment on the surface condition so that adaptive measurement control is realized quickly according to the surface condition of the workpiece.

Preferably, each of the parameters is defined as a function of its correspondence to the surface condition.

A surface scan measuring device according to the present invention preferably further has a relative position determining section for determining the positional deviation of the relative position relative to the reference position and a measurement mode switching section for switching the measurement mode according to the outcome of the decision of the relative position determining section.

With this arrangement, the current measurement mode can be switched to some other measurement mode according to the value of the determined positional deviation so that it is possible to measure the surface of the workpiece accurately and reliably to a greater extent. For example, if the positional deviation is too large or too small, the measurement parameters and the control parameters may possibly be not appropriate. Then, the user can temporarily suspend the ongoing measurement and switch the measurement mode before resuming the scan measuring by manually modifying the measurement parameters and the control parameters using the modified parameters.

The relative position determining section may be so adapted as to compare the positional deviation and a marginal positional deviation defining the marginal value for the positional deviation. When it compares the positional deviation and the marginal positional deviation, it may take the elapsed time and the covered distance into consideration. For example, the current measurement mode may be switched to some other measurement mode when the positional deviation exceeds the marginal positional deviation for more than a predetermined time period or by more than a predetermined distance while the scanning probe is advancing. Alternatively, the current measurement mode may be switched to some other measurement mode according to the statistic quantity of the differences between the positional deviation and the marginal positional deviation. For example, the current measurement mode may be switched to some other measurement mode when the average value of the differences between the positional deviation and the marginal positional deviation for a predetermined distance exceeds a predetermined value. Still alternatively, the current measurement mode may be switched to some other measurement mode according to the increasing or decreasing tendency of the difference between the positional deviation and the marginal positional deviation.

A marginal positional deviation may be provided either at the upper side (the positive side) or at the lower side (the negative side) of the reference position or at the both sides. Furthermore, a plurality of marginal positional deviations may be provided.

There is no limit for measurement modes to be selected. Any measurement modes may be used for the purpose of the present invention. Examples of measurement modes include manual parameter modification, scanning mode switching, replacement of the measuring element, replacement of the scanning probe, modification of the work mounting attitude such as inclination and rotation, modification of the surface scan measuring device installing environment such as ambient temperature and interruption of measurement for a predetermined time period. The current measurement mode may be switched by altering the corresponding relationship between the surface condition of the workpiece and the parameters including the measurement parameters and the control parameters or by modifying the marginal positional deviation and/or the reference position to an optimal value by way of an internal process. The operation of switching the current measurement mode may be conducted automatically or manually. In short, it is sufficient for the switching to improve the performance of the measurement in terms of measurement accuracy and the required time of measurement.

Preferably, for the purpose of the present invention, the relative position determining section further marginally compares the positional deviation and the marginal positional deviation and determines the difference and the measurement mode switching section puts back the scanning probe to a position indicated by the past measurement data stored in the measurement data storage section and modifies at least one of the measurement parameters and the control parameters according to the outcome of the marginal comparison and determination.

When, for example, the positional deviation exceeds the marginal positional deviation, the relative position determining section may judge that the scanning probe pushes in excessively relative to the surface of the workpiece or breaks away excessively from the surface of the workpiece and determines the current situation as error.

When the scanning probe is in a state of excessive push-in or breakaway and hence an error has occurred, the measurement mode switching section puts back the scanning probe to a position indicated by the past measurement data to prevent the scanning probe from being damaged or falling into a measurement disabled state and make the measurement automatically continue.

An area of the surface of the workpiece where an error can occur may show undulations to a large extent so that, when an error occurs, the scanning probe is put back to the position indicated by the normally acquired newest data and then the moving speed, which is one of the measurement parameters, is modified to a lower speed before the scanning operation is resumed. With this arrangement, it is possible to conduct an appropriate surface scanning operation thereafter.

After putting back the scanning probe according to an error judgment, the moving speed, which is one of the measurement parameters, may be reduced and the sampling pitch, which is also one of the measurement parameters, may be modified and increased or decreased. Then, it is possible to acquire appropriate measurement data to reflect the undulations on the surface of the workpiece.

After putting back the scanning probe according to an error judgment, the scanning control gain and the servo control gain, which are two of the control parameters, may be modified. Then, it is possible to prevent errors such as excessive push-in or breakaway from taking place in advance.

An occurrence or non-occurrence of error may be determined on the basis of the outcome of comparison made by taking the elapsed time and the covered distance into consideration, the outcome of comparison made on the basis of the statistic quantity of the observed positional deviations or the outcome of comparison made on the basis of the increasing or decreasing tendency of positional deviation other than the comparison of the current positional deviation and the marginal positional deviation.

A marginal positional deviation may be provided either at the upper side (the positive side) or at the lower side (the negative side) of the reference position or at the both sides. Furthermore, a plurality of marginal positional deviations may be provided.

Preferably, the present invention further includes a trajectory generating section for generating a predetermined route of scanning according to the form data of the workpiece input in advance and the scanning vector commanding section includes an autonomous scanning vector generating section for automatically generating, according to the relative position at the current time point, the next scanning vector and a trajectory scanning vector generating section for generating a scanning vector for scanning the scanning probe along the predetermined route generated by the trajectory generating section, the relative position determining section being adapted to further marginally compare the positional deviation and the marginal positional deviation and determine the difference, the measurement mode switching section being adapted to control switching between the trajectory scanning of the trajectory scanning vector generating section and the autonomous scanning of the autonomous scanning vector generating section, according to the outcome of the marginal comparison and determination.

With this arrangement, an occurrence of error is determined when the positional deviation exceeds the marginal positional deviation so that the scanning operation proceeds along the trajectory that is generated by the trajectory generating section in advance as long as an occurrence of error is not determined. As a result, the scanning operation progresses highly efficiently at a high speed. If, on the other hand, an occurrence of error is determined, the current scanning operation proceeding along the trajectory is judged to be not appropriate and an autonomous scanning operation takes place, autonomously searching the workpiece.

An occurrence or non-occurrence of error may be determined on the basis of the outcome of comparison made by taking the elapsed time and the covered distance into consideration, the outcome of comparison made on the basis of the statistic quantity of the observed positional deviations or the outcome of comparison made on the basis of the increasing or decreasing tendency of positional deviation other than the comparison of the current positional deviation and the marginal positional deviation.

A marginal positional deviation may be provided either at the upper side (the positive side) or at the lower side (the negative side) of the reference position or at the both sides. Furthermore, a plurality of marginal positional deviations may be provided.

Preferably, the present invention further includes a trajectory generating section for generating a predetermined route of scanning according to the form data of the workpiece input in advance and the scanning vector commanding section includes a trajectory scanning vector generating section for generating a scanning vector for causing the scanning probe to scan along the predetermined route generated by the trajectory generating section, the relative to position determining section being adapted to further marginally compare the positional deviation and the marginal positional deviation and determine the difference, the measurement mode switching section being adapted to modify the predetermined route according to the outcome of the marginal comparison and determination.

With this arrangement, an occurrence of error is determined when the positional deviation exceeds the marginal positional deviation so that the scanning route is modified according to the judgment on the error if such an occurrence of error is determined. Thus, the trajectory scanning is realized along the modified route. Then, the scanning operation is continued when an error such as excessive push-in occurs and also the trajectory scanning is continued along the trajectory that is computationally determined in advance so that the scanning operation will be conducted highly efficiently and completed in a short period of time to improve the efficiency of measurement.

The scanning route may be modified, for instance, by moving the route to the outside by a predetermined quantity when the positional deviation falls below the marginal positional deviation to the negative side and hence occurrence of an error of excessive push-in of the scanning probe is determined or by moving the route to the inside by a predetermined quantity when the positional deviation rises above the marginal positional deviation to the positive side and hence occurrence or an error of insufficient push-in of the scanning probe is determined. Alternatively, if the predetermined route is generated by offsetting by a predetermined quantity according to the form data, the predetermined route may be generated once again by increasing or decreasing the quantity of the offset.

An occurrence or non-occurrence of error may be determined on the basis of the outcome of comparison made by taking the elapsed time and the covered distance into consideration, the outcome of comparison made on the basis of the statistic quantity of the observed positional deviations or the outcome of comparison made on the basis of the increasing or decreasing tendency of positional deviation other than the comparison of the current positional deviation and the marginal positional deviation.

A marginal positional deviation may be provided either at the upper side (the positive side) or at the lower side (the negative side) of the reference position or at the both sides. Furthermore, a plurality of marginal positional deviations may be provided.

For the purpose of the present invention, the measurement mode switching section preferably adjusts at least one of the measurement parameters and the control parameters according to the positional deviation.

With this arrangement, for example, the moving speed, the scanning control gain and/or the servo control gain are adjusted according to the extent of the positional deviation so that the position of the scanning probe is modified before a fatal abnormality such as excessive push-in or breakaway relative to the surface of the workpiece occurs and the scanning operation is continued normally.

When, for example, the moving speed is adjusted according to the extent of the positional deviation, preferably, the moving speed is reduced when the absolute value of the positional deviation is increased, whereas the moving speed is raised when the absolute value of the positional deviation is decreased. When, the scanning or servo control gain is adjusted according to the extent of the positional deviation, preferably, the scanning or servo control gain is raised when the absolute value of the positional deviation is increased, whereas the scanning or servo control gain is reduced when the absolute value of the positional deviation is decreased. Then, in any case, the responsiveness of the scanning control is improved as the scanning probe advances so that the positional deviation becomes less fluctuating and hence it is possible to conduct the scanning operation stably and efficiently.

When any of the parameters is adjusted according to the extent of the positional deviation, it is not necessary to establish a proportional relationship so long as the parameter is adjusted with an appropriate correlation. However, for example, the moving speed may be adjusted on the basis of a function such as a quadratic function. The adjustment process can be made to proceed quickly when a table describing the relationship of correspondence between the positional deviation and the parameter value is provided in advance and the parameter is adjusted according to the table.

For the purpose of the present invention, preferably, the measurement condition deciding section adjusts the control parameters according to the moving speed.

With this arrangement, the measurement parameters and the control parameters are determined or adjusted according to the decision on the surface condition and the scanning control parameters such as the push-in control gain that is used when generating a scanning vector and the servo control parameters such as the servo control gain that is defined by the drive control section are adjusted further according to the moving speed of the scanning probe as a result of the above adjustment so that the scanning operation of the scanning probe can be conducted under more appropriate conditions.

For example, when the radius of curvature of the surface of the workpiece is small and consequently the moving speed of the scanning probe is reduced, the performance of the scanning probe for tracking the surface of the workpiece will be improved by further increasing the scanning control gain and the servo control gain. Then, the scanning probe can accurately trace a local area of the surface of the workpiece. In other words, the scanning probe can operate accurately and make a sharp turn.

When, on the other hand, when the radius of curvature of the surface of the workpiece is large and consequently the moving speed of the scanning probe is raised, the performance of the scanning probe for tracking the surface of the workpiece will be stabilized by further decreasing the scanning control gain and the servo control gain. Then, the scanning probe can stably trace the surface of the workpiece. In other words, it is possible to control the advancement of the scanning probe in a stable manner with reduced vibrations by reducing the influence of external turbulences.

Preferably, the present invention further includes a measurement condition storage section for storing the specified region defined and input in advance along with at least one of the measurement parameters and the control parameters as measurement conditions in the specified region and a specified region judging section for judging if the current scanning point of the scanning probe is in the specified region or not and, if the current scanning point is judged to be in the specified region by the specified region judging section, the scanning vector commanding section commands the scanning vector according to the parameter stored in the measurement condition storage section while the measurement data storage section samples the measurement data according to the parameter stored in the measurement condition storage section.

With this arrangement, a specified region is specified in advance and a scan measuring operation of the scanning probe is conducted in the specified region with the specified values of the measurement parameters such as the moving speed and the sampling pitch and the control parameters. Then, for example, a small region of the surface of the workpiece that locally shows a small radius of curvature may be specified as specified region and the values specified for the measurement parameters and the control parameters are used in the specified region so that abnormal situations such as excessive push-in and breakaway of the scanning probe are prevented from taking place. If, additionally, a high sampling pitch is specified as specified pitch along with a specified region of the surface of the workpiece that needs to be scanned/measured precisely, the specified region is scanned/measured more precisely than other regions. Then, the time required for the operation of scan measuring the entire surface of the workpiece is reduced if compared with the time necessary for scan measuring the entire surface precisely.

It is not necessary to specify all the measurement parameters and the control parameters for the specified region. The values determined or adjusted by the measurement condition deciding section may be used for those parameters that are not specified.

If the servo control parameters are specified for the specified region, the drive control section controls the system in the specified region, using the specified servo control parameters.

For the purpose of the present invention, when the scanning probe leaves the specified region, the parameters that were used before entering the specified region or the initial parameters may be reused. Alternatively, the parameters at the time of leaving the specified region may be maintained continuously and subsequently the parameters may be determined or adjusted according to the adaptive measurement control condition.

For the purpose of the present invention, preferably, when the measurement parameters and the control parameters are updated as a result of determination or adjustment, the updated parameters move smoothly from the old values to the new values.

Thus, with this arrangement, the parameters move smoothly from the old values to the new values when the parameter values updated as a result of determination or adjustment.

For instance, when the moving speed of the scanning probe is updated from Va to Vb, the moving speed is not abruptly switched from Va to Vb but made to gradually approach Vb within a predetermined period of time. Then, it is possible to prevent unnecessary vibrations from being generated in the control system and hence any unnecessary vibrations can be prevented from appearing in the moving section. Generally speaking, when vibrations occur in the moving section, they propagate to the entire measuring device and the scan measuring operation can become unstable until the vibrations attenuate and end. However, with the above arrangement of the present invention, it is possible to prevent such unnecessary vibrations from being generated to improve the accuracy and the reliability of the measurement data acquired as a result of the scan measuring operation. A similar effect can be obtained when the servo control gain is updated.

To achieve a smoothing effect, a technique of using a low changing rate of the moving speed may be adopted in addition to the technique of linearly interpolating between Va and Vb when updating the moving speed.

When a plurality of parameters are shifted, each of the parameters may be shifted smoothly or all the parameters may be synchronously shifted.

A surface scan measuring device according to another aspect of the present invention includes: a scanning probe having a detecting section for detecting the relative position of itself relative to the surface of a workpiece along a normal line direction of the surface of the workpiece and adapted to scan the surface of the workpiece in a condition where the relative position of the detecting section relative to the surface of the workpiece is maintained within a predetermined range centered at a predefined reference position; a moving section for moving the scanning probe; a measurement data storage section for sampling the output of the detecting section and the drive quantity of the moving section at a predetermined sampling pitch and storing the sampled data as measurement data; a relative position determining section for determining the positional deviation of the relative position relative to the reference position; a measurement condition deciding section for deciding, according to the positional deviation, the adaptive measurement control conditions by determining or adjusting at least one of the measurement parameters including the moving speed for moving the scanning probe and the sampling pitch and the control parameters including the control gain; a scanning vector commanding section for commanding the scanning vector for moving the scanning probe according to the moving speed; and a drive control section for driving and controlling the moving section according to the scanning vector and the control parameters.

With the above-described arrangement, as the scanning probe scans the surface of the workpiece, the positional deviation is compared and the tracing performance of the scanning probe relative to the surface of the workpiece is judged by the relative position determining section.

Then, the measurement parameters and the control parameters for controlling the scan measuring operation are appropriately determined or adjusted according to the position and/or the tracing performance.

The measurement parameters may include the sampling pitch for acquiring the moving speed for moving the scanning probe and the measurement data at predetermined time intervals or predetermined distance intervals and other parameters. The control parameters may include scanning control parameters and servo control parameters, of which the scanning control parameters may include the scanning control gain for determining the tracking ability for scanning control when the scanning vector commanding section generates the scanning vector and the servo control parameters may include servo control gains such as a position loop gain and a speed loop gain for the servo control loop of the drive control section and a phase compensation element such as a phase lead or a phase lag and a feed forward compensation element.

For instance, if a tendency of excessive push-in or insufficient push-in or breakaway is observed as the scanning probe advances, the moving speed of the scanning probe that is defined at the start of the measuring operation or the moving speed of the scanning probe that is adjusted subsequently is adjusted and reduced. If, to the contrary, the positional deviation fluctuates little and an excellent tracing performance is observed, a higher moving speed is determined or the moving speed is adjusted and raised. When the moving speed of the scanning probe is determined or adjusted according to the tracing performance of the scanning probe that is observed as the scanning probe advances in this way, errors such as excessive push-in and insufficient push-in or breakaway from the surface of the workpiece hardly occur. Conversely, the scanning probe is moved at high speed to remarkably reduce the time required for the surface measurement if the tracing performance of the scanning probe is excellent.

Additionally, the standard sampling pitch determined at the time of starting the measurement or the sampling pitch adjusted thereafter is adjusted to a narrower pitch if the positional deviation fluctuates to a large extent and the tracing performance of the scanning probe is not excellent, whereas the sampling pitch is adjusted to a broader pitch if the tracing performance of the scanning probe is excellent. Thus, a situation where the form of the workpiece cannot be analyzed accurately because of too scarce measurement data can be avoided when the sampling pitch is determined or adjusted according to the tracing performance of the scanning probe in this way. Additionally, there is no risk of acquiring measurement data excessively and hence it is possible to carry out a scan measuring operation within an appropriate time period. In other words, the time required for the scan measuring operation is reduced.

The sampling pitch may be defined either in terms of predetermined distance intervals or in terms of predetermined time intervals of movement of the scanning probe. Either of them may be arbitrarily selected and subsequently altered according to the surface condition of the workpiece and the results of analysis of the measurement data.

Furthermore, the servo control gain determined at the time of starting the measurement or the servo control gain adjusted thereafter is adjusted to a higher gain when the positional deviation fluctuates to a large extent and the tracing performance of the scanning probe is not excellent, whereas the servo control gain is adjusted to a lower gain when the positional deviation fluctuates little and the tracing performance of the scanning probe is excellent. Thus, when the tracing performance of the scanning probe is judged according to the positional deviation and the servo control gain and the scanning control gain are determined or adjusted according to the judgment in this way, the tracing performance of the drive control section or that of the scanning control operation is improved so that errors such as excessive push-in and insufficient push-in or breakaway from the surface of the workpiece of the scanning probe hardly occur. Additionally, the stability of operation of the drive control section is improved to by turn remarkably improve the accuracy of the sampled measurement data.

The scanning vector commanding section may either autonomously generate a scanning vector and specify it or generate a track scanning vector according to the track (predetermined route) generated according to the form data that are input in advance and specify it. When the moving speed is decided by the measurement condition deciding section, the scanning vector commanding section generates a scanning vector for moving the scanning probe at the moving speed decided by the measurement condition deciding section.

The scanning probe may be either of the type having a measuring element to be held in contact with the surface of the workpiece and a detection sensor for detecting the state of contact (extent of push-in or the like) of the measuring element or of the non-contact type having a measuring element to be held away from the surface of the workpiece and a detection sensor for detecting the distance between the measuring element and the surface of the workpiece. For detecting the distance between the measuring element and the surface of the workpiece, the measuring element may be realized by an electrode plate that operates as a static capacitance detecting type measuring element for detecting the static capacitance of the capacitor formed by the electrode plate of the measuring element and the surface of the workpiece.

If a plurality of moving sections are provided for the three directions of orthogonal three axes, servo control parameters may be determined or adjusted for each of the axes or servo control parameters may be determined or adjusted commonly for all the axes.

If a plurality of parameters are provided as scanning control parameters for the direction of height, for the push-in direction and so on, the parameters may be determined or adjusted individually or all the parameters may be commonly determined or adjusted.

Since the scanning probe is controlled appropriately on the adaptive measurement control condition in this way, it is possible to carry out a scan measuring operation stably and at high speed.

While servo refers to a closed loop control by means of feedback of a position or an angle in a narrow sense, it does not necessarily refer to the closed loop control for the purpose of the present invention. In other words, it may refer to an open loop control typically using a pulse motor without giving rise to any problem for the purpose of the present invention. Therefore, parameters of a system adapted to position control of a predetermined level of accuracy are referred to as servo control parameters.

A surface scan measuring method according to still another aspect of the present invention is for scan measuring the surface of a workpiece by moving, with a moving section, a scanning probe having a detecting section for detecting the relative position of itself relative to the surface of a workpiece along a normal line direction of the surface of the workpiece and adapted to scan the surface of the workpiece in a condition where the relative position of the detecting section relative to the surface of the workpiece is maintained within a predetermined range centered at a predefined reference position, the method including: a measurement data storage step of sampling the output of the detecting section and the drive quantity of the moving section at a predetermined sampling pitch and storing the sampled data as measurement data; at least either a surface condition determining step of determining the surface condition of the workpiece according to the measurement data or a relative position determining step of determining the positional deviation of the relative position relative to the reference position; a measurement condition deciding step of deciding, according to the decision of the surface condition determining step or that of the relative position determining step, the adaptive measurement control condition of the device by determining or adjusting at least one of the measurement parameters, which include the moving speed for moving the scanning probe and the sampling pitch, and the control parameters, which include the control gain; a scanning vector commanding step of commanding the scanning vector for moving the scanning probe according to the decision of the measurement condition deciding step; and a drive control step of driving and controlling the moving section according to the scanning vector and the control parameters.

With the above-defined arrangement, it is possible to provide advantages similar to those described above by referring to a surface scan measuring device according to the present invention. More specifically, the measurement parameters and the control parameters are determined or adjusted according to the surface condition of the workpiece and/or the tracing performance of the scanning probe relative to the surface of the workpiece. For instance, if it is determined that the surface of the workpiece shows undulations to a large extent or the tracing performance of the scanning probe is not excellent according to the positional deviation, the moving speed is adjusted to a lower level. Then, errors such as excessive push-in and insufficient push-in or breakaway from the surface of the workpiece of the scanning probe hardly occur. If, on the other hand, it is determined that the surface of the workpiece shows undulations only to a small extent or the tracing performance is excellent according to the positional deviation, the moving speed is adjusted to a higher level. Then, the time required for the scan measuring operation is reduced. Similarly, other measurement parameters and the control parameters are appropriately determined or adjusted according to the surface condition of the workpiece and/or the tracing performance of the scanning probe relative to the surface of the workpiece so that it is possible to carry out a scan measuring operation stably and efficiently as a whole.

A surface scan measuring program according to still another aspect of the present invention is for incorporating a computer into a surface scan measuring device for scan measuring the surface of a workpiece by moving, with a moving section, a scanning probe having a detecting section for detecting the relative position of itself relative to the surface of a workpiece along a normal line direction of the surface of the workpiece and adapted to scan the surface of the workpiece in a condition where the relative position of the detecting section relative to the surface of the workpiece is maintained within a predetermined range centered at a predefined reference position; the program being adapted to cause the computer to operate as: a measurement data storage section for sampling the output of the detecting section and the drive quantity of the moving section at a predetermined sampling pitch and storing the sampled data as measurement data; at least either a surface condition determining section for determining the surface condition of the workpiece according to the measurement data or a relative position determining section for determining the positional deviation of the relative position relative to the reference position; a measurement condition deciding section for deciding, according to the decision of the surface condition determining section or that of the relative position determining section, the adaptive measurement control condition by determining or adjusting at least one of the measurement parameters including the moving speed for moving the scanning probe and the sampling pitch and the control parameters including the control gain; a scanning vector commanding section for commanding the scanning vector for moving the scanning probe according to the decision of the measurement condition deciding section; and a drive control section for driving and controlling the moving section according to the scanning vector and the control parameters.

A recording medium according to still another aspect of the present invention is stored with, in a computer-readable manner, aforesaid surface scan measuring program.

With the above-defined arrangement, it is possible to provide advantages similar to those described above by referring to a surface scan measuring device according to the present invention. Additionally, since the program is designed to incorporate a computer having a CPU (central processing section) and a memory (storage device) to function as the above-described operator, the parameters of each of the operator (operating sections) can be modified with ease. Fort example, the method of deciding the measurement conditions in the measurement condition deciding section and the specified region and the measurement conditions in the measurement condition storage section can be modified with ease.

The program may be installed into the computer by loading a storage medium that stores the program in a computer directly or indirectly. Alternatively, a reading device for reading information from the storage medium may be attached to the computer so as to install the program into the computer by way of the reading device. Still alternatively, the program may be supplied to the computer by way of a communication line such as the Internet, a LAN cable or a telephone line or wirelessly and installed into the computer.

Any computer language may be used to describe the program. Examples of languages that can be used for the purpose of the present invention include Assembler and Compiler in a text format or in a graphical format. As for the language processing level of the program, it may be in the form of source code, intermediate code of an interpreter format or object code.

DETAILED DESCRIPTION OF THE PREFERRED EMBODIMENTS

Now, the present invention will be described by referring to the accompanying drawings that schematically illustrate preferred embodiments of the present invention with reference symbols denoting the components thereof.

First Embodiment

[Configuration of Measuring System]

Figure 1:
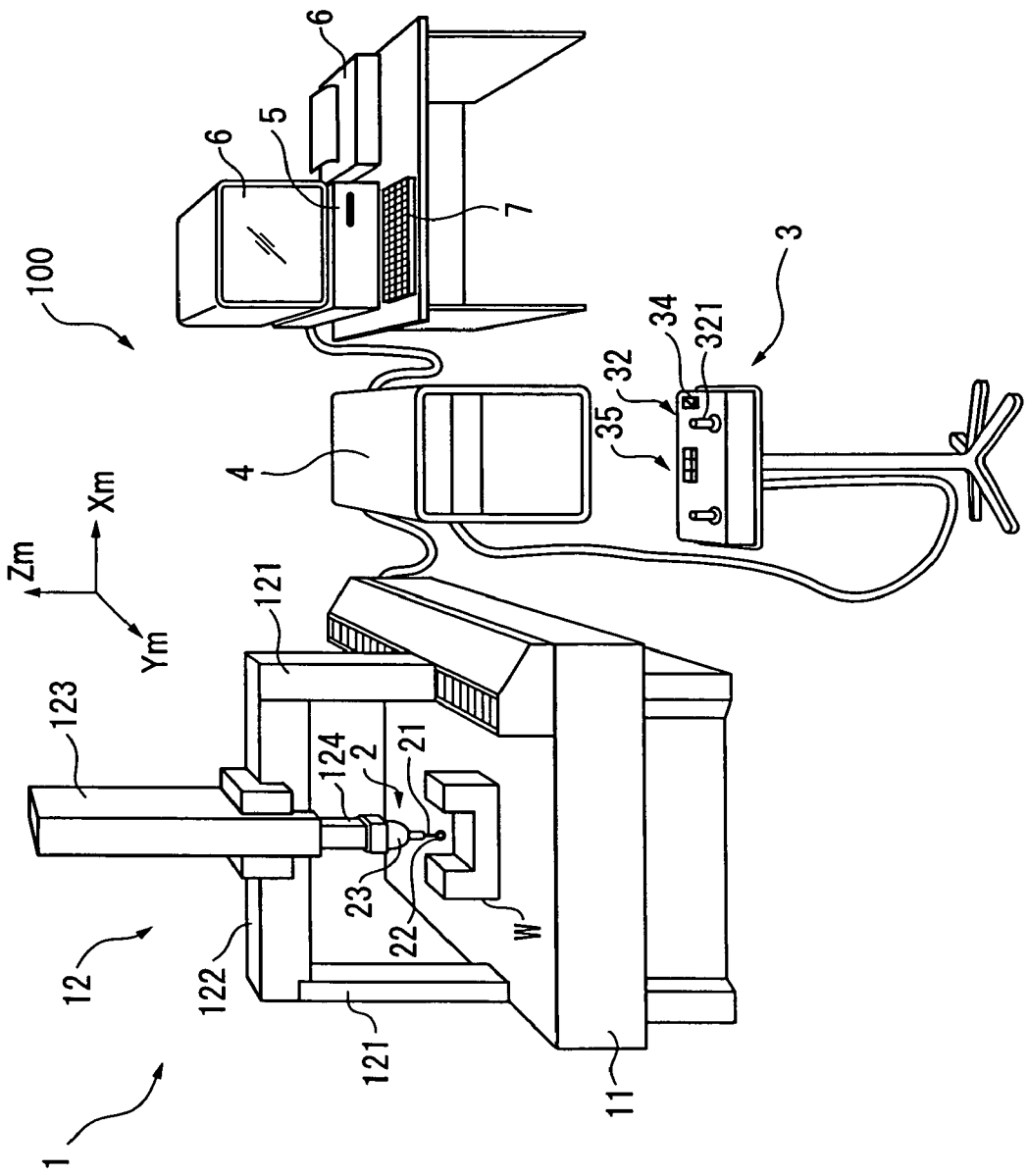
FIG. 1 is a schematic illustration showing the overall configuration of a measuring system according to a first embodiment of the present invention.

FIG. 1 is a schematic illustration of the first embodiment of the present invention, which is a measuring system including a coordinate measuring machine, showing the overall configuration thereof.

The measuring system 100 includes a coordinate measuring machine 1, an operating section 3 for manually operating the coordinate measuring machine 1, a motion controller 4 for driving and controlling the coordinate measuring machine 1 and a host computer 5 for issuing predetermined commands to the motion controller 4 and executing arithmetic processing operations such as form analysis of the workpiece W, an input section 7 for inputting the measuring conditions and an output section 6 for outputting the results of measurement.

The coordinate measuring machine 1 includes a surface plate 11, a drive mechanism (moving section) 12 standing on the surface plate 11 to drive a scanning probe 2 to move three-dimensionally, a drive sensor 13 (see FIG. 3) for detecting the drive quantity of the drive mechanism 12.

The drive mechanism 12 includes a column 123 having a guide in the direction of Zm-axis and adapted to drive a beam 122 of a portal frame 121 to slide in the direction of Xm-axis, the portal frame 121 being adapted to slide in the direction of Ym-axis, and a spindle 124 arranged in the column 123 and adapted to slide in the direction of the Zm-axis. The scanning probe 2 is held to the lower end of the spindle 124.

A machine coordinate system is defined by the Xm-axis direction, the Ym-axis direction and the Zm-axis direction of the drive mechanism 12 (see FIG. 1).

The Xm-axis, the Ym-axis and the Zm-axis of the drive mechanism 12 are drive axes that are orthogonal relative to each other and a slide member is constituted by the portal frame 121, the column 123 and the spindle 124.

Although not shown, the drive sensor 13 has a Ym-axis sensor for detecting the movement of the portal frame 121 in the Ym direction, an Xm-axis sensor for detecting the movement of the column 123 in the Xm direction and a Zm-axis sensor for detecting the movement of the spindle 124 in the Zm direction. The outcome of detection of the drive sensor 13 is output to the host computer 5 by way of the motion controller 4.

Figure 2:
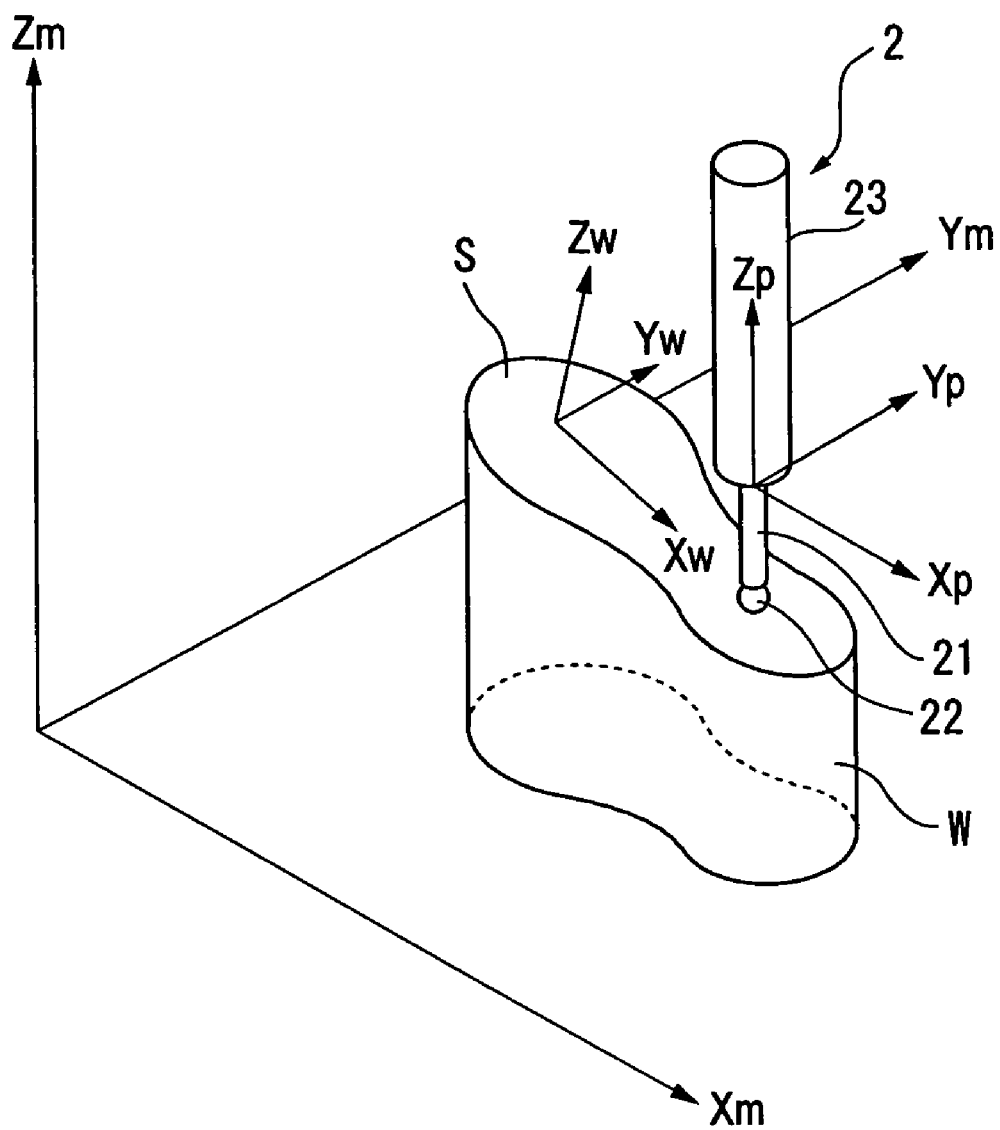
FIG. 2 is a schematic illustration showing how a scanning probe scans, and showing the relationship of a machine coordinate system, a work coordinate system and a probe coordinate system, according to the first embodiment.

FIG. 2 schematically illustrates the configuration of the scanning probe 2. Referring to FIG. 2, the scanning probe 2 includes a stylus 21 having a contact section (measuring element) at the front end thereof and a support section 23 for supporting the base end of the stylus 21 in such a way that it can slide in Xp direction, in Yp direction and in Zp direction within a predetermined range.

Figure 3:
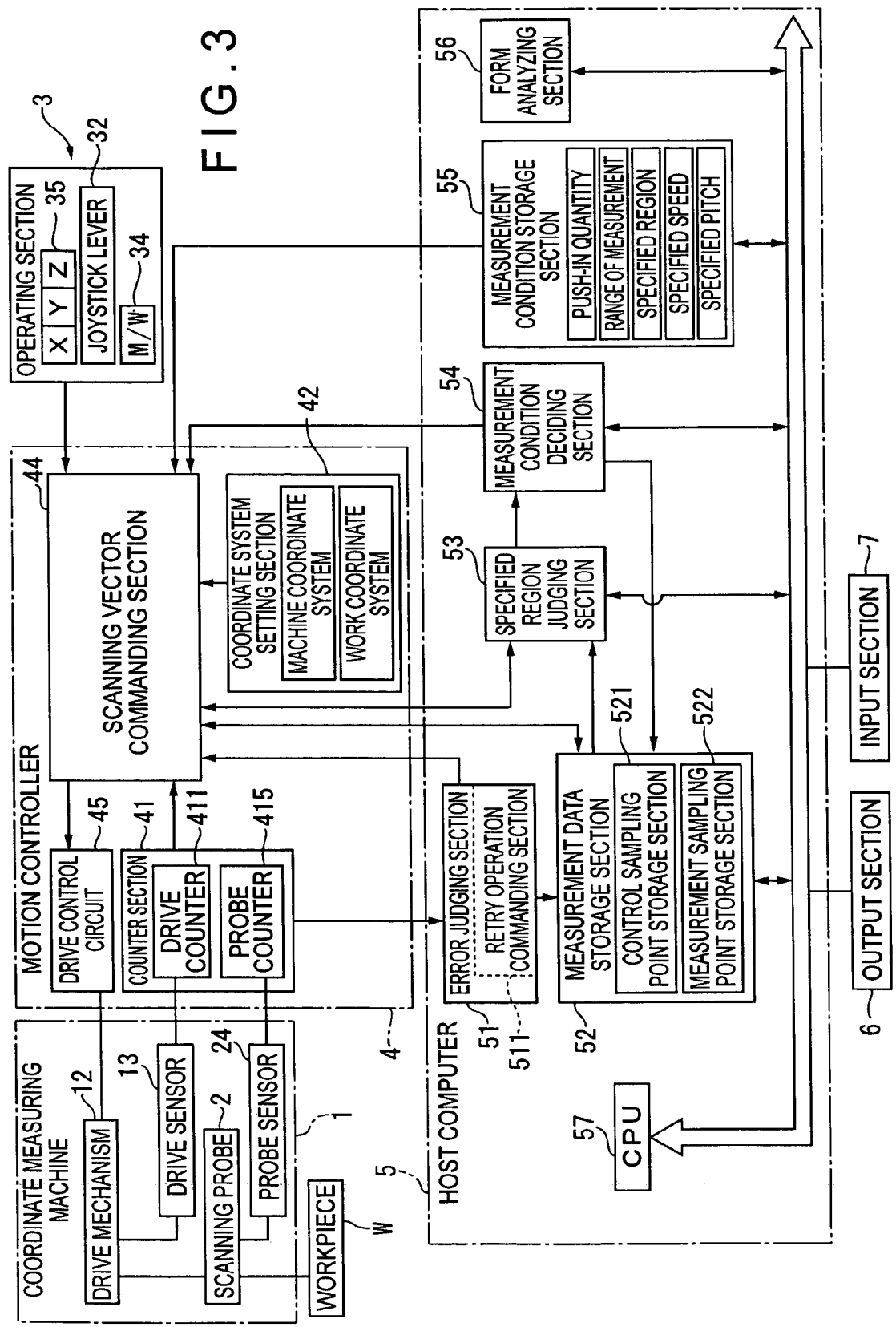
FIG. 3 is a block diagram showing the function of the measuring system according to the first embodiment.

The support section 23 by turn includes a slide mechanism (not shown) having an xp slider, a yp slider and a zp slider that can move in respective directions that are orthogonal relative to each other and a probe sensor 24 for detecting the quantity of displacement of the slide mechanism in each axial direction and outputting the detected quantity of displacement (see FIG. 3). The stylus is slidably supported by the slide mechanism so as to be able to slide within a predetermined range relative to the support section 23 and urged to return to the original point under a predetermined level of pressure.

Although not shown specifically, the probe sensor (detecting section) 24 includes an Xp direction sensor for detecting the movement of the stylus 21 in the Xp direction, a Yp direction sensor for detecting the movement of the stylus 21 in the Yp direction and a Zp direction sensor for detecting the movement of the stylus 21 in the Zp direction. The quantity of displacement of the stylus 21 detected by the probe sensor 24 is output to the host computer 5 by way of the motion controller 4.

A detecting section is formed by the stylus 21 having a contact section 22 and the support section 23.

The probe coordinate system is defined by the Xp direction, the Yp direction and the Zp direction of the slide mechanism (see FIG. 2).

As shown in FIG. 2, the work coordinate system is defined by using surface S of the workpiece W that is placed on the surface plate 11 as reference. The work coordinate system is typically defined by defining directions that are orthogonal relative to each other on a plane that is defined by specified three points on a predetermined surface S of the workpiece W as Xw direction and Yw direction and a normal line relative to the plane as Zw direction.

The operating section 3 includes a joystick 32 that is a manual operation member for manually operating the scanning probe 2 to move, a coordinate system selection switch (coordinate system selection section) 34 for selecting the coordinate system to be used when commanding a moving direction and a fixing axis selection switch (axis selection section) 35 for selecting the axis to be used for fixing the movement of the scanning probe 2. The machine coordinate system and the work coordinate system are selected by switching from one to the other by the coordinate system selection switch 34. The fixing axis selection switch 35 includes an x-axis fixing switch, a y-axis fixing switch and a z-axis fixing switch and the movement of the scanning probe 2 is prohibited along the selected axis. For example, if the x-axis fixing switch is selected, the movement of the scanning probe 2 is limited to the YZ-plane. The directions of the axes agree with those of the selected coordinate system (the machine coordinate system or the work coordinate system) selected by the coordinate system selection switch 34.

FIG. 3 shows a functional block diagram of the measuring system.

The motion controller 4 includes a counter section 41 for counting the drive quantity of the coordinate measuring machine 1, a coordinate system setting section 42 for setting a predetermined coordinate system, a scanning vector commanding section 44 for outputting a vector command for driving the scanning probe 2 to move along and scan the surface of the workpiece and a drive control circuit (drive control section) 45 for driving and controlling the drive mechanism (moving section) 12 according to the scanning vector command from the scanning vector commanding section 44.

The counter section 41 by turn includes a drive counter 411 for measuring the drive quantity of the drive mechanism 12 by counting the pulse signals output from the drive sensor 13 and a probe counter 415 for measuring the slide quantity of the stylus 21 as push-in quantity by counting the pulse signals output from the probe sensor 24. Although not illustrated specifically, the drive counter 411 includes counters for counting the respective outputs in the respective axial directions (the directions of the Xm-axis, the Ym-axis, the Zm-axis) detected by the drive sensor 13, whereas the probe counter 415 includes counters for counting the respective outputs in the respective axial directions (the directions of the Xp-axis, the Yp-axis, the Zp-aixs).

The coordinate system setting section 42 receives the set axes of the machine coordinate system and those of the work coordinate system as input and sets either the machine coordinate system or the work coordinate system, switching from one to the other, according to the input operation of the coordinate system selection switch 34. The coordinate system setting section 42 outputs the switched and set coordinate system to the scanning vector commanding section 44. While the machine coordinate system is set in advance at the time of shipment, the work coordinate system is generated at the time of measurement according to the workpiece.

Figure 4:
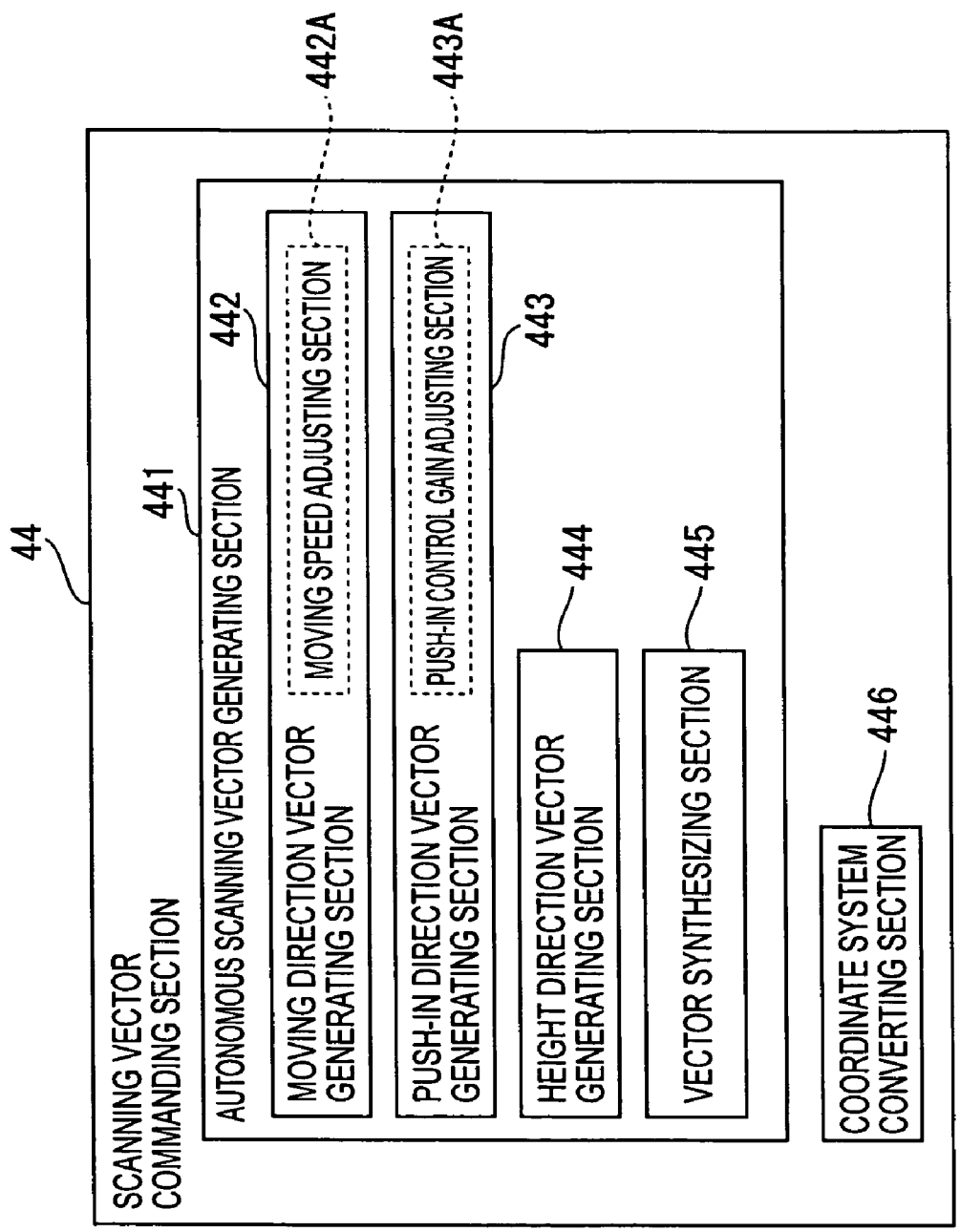
FIG. 4 is a schematic illustration showing the configuration of a scanning vector commanding section according to the first embodiment.

As shown in FIG. 4, the scanning vector commanding section 44 includes an autonomous scanning vector generating section 441 for generating a vector for autonomously moving the scanning probe 2 for scanning along the surface of the workpiece and a coordinate system converting section 446 for coordinate system conversion for adapting the scanning vector to the command in the machine coordinate system.

The autonomous scanning vector generating section 441 by turn includes a moving direction vector generating section 442 for generating a vector for the moving direction of the scanning probe 2, a push-in direction vector generating section 443 for generating a vector for the push-in direction relative to the workpiece W (in a normal line direction of the surface of the workpiece), a height direction vector generating section 444 for generating a vector for the direction of deviation from the height defined as region of the workpiece and a vector synthesizing section 445 for generating an autonomous scanning vector by synthesizing the moving direction vector, the push-in direction vector and the height direction vector.

The moving direction vector generating section 442 has a moving speed adjusting section 442A for adjusting the speed in the moving direction and the push-in direction vector generating section 443 has a push-in control gain adjusting section 443A for adjusting the push-in control gain in the push-in direction.

Figure 5:
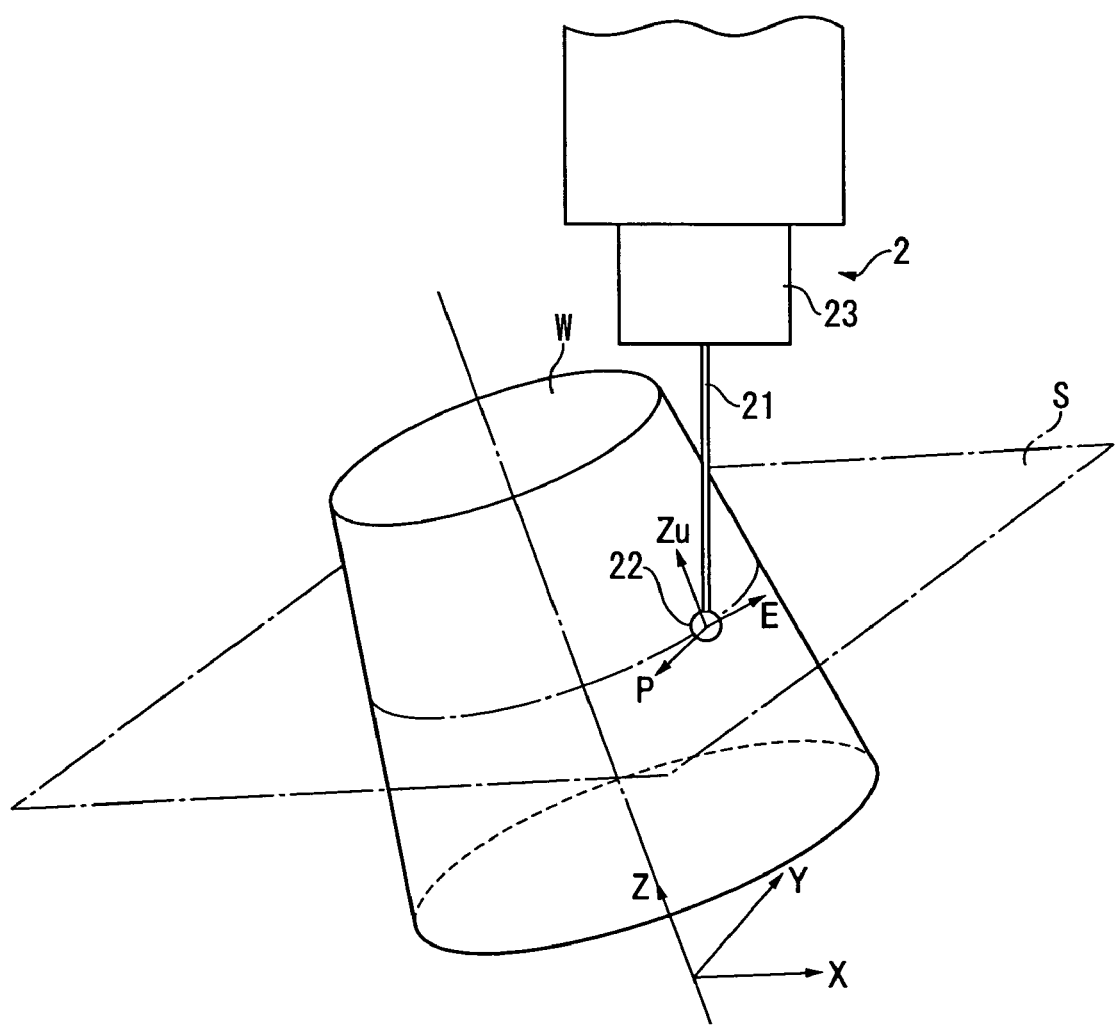
FIG. 5 is a schematic illustration showing how an autonomous scanning vector is generated, according to the first embodiment.

The process of generating an autonomous scanning vector of the autonomous scanning vector generating section 441 will be described briefly below by referring to FIGS. 5, 6 and 7. Assume here that the contour of the surface of the workpiece is autonomously scanned in plane S defined by fixing the Z-coordinate to a constant value for the range of measurement (see FIG. 5).

The moving direction vector generating section 442 generates a moving direction vector $\vec{V}_P$ by synthesizing the moving speed $V_s$ and the unit vector $P_u$ in the moving direction. In the following description, $Z_u$ represents the unit vector in the Z direction and E represents the vector in the push-in direction of the probe (equal to the output value of the scanning probe).

$$\text{moving direction vector } \vec{V}_P = V_S \cdot \vec{P}_u$$

where $$\vec{P}_u = \frac{\vec{P}}{|\vec{P}|}$$

$$\vec{P} = \vec{E} \times \vec{Z}_u$$

The push-in direction vector generating section 443 generates a push-in direction vector $V_E$, using the unit vector $E_u$ in the push-in direction and the push-in displacement a. In the following description, |E| represents the output value of the scanning probe 2 and $E_0$ represents the reference push-in quantity (e.g., 1,000 μm), while $V_e$ represents the control gain in the push-in direction, which is adjusted to increase or decrease by the push-in control gain adjusting section 443A according to the moving speed $V_s$ in such a way that the push-in control gain $V_e$ is typically adjusted to increase when the moving speed $V_s$ is small.

push-in direction vector $\vec{V}_E = V_e \cdot \alpha \cdot \vec{E}_u$ where $$\alpha = |\vec{E}| - E_0$$

$$\vec{E}_u = \frac{\vec{E}}{|\vec{E}|}$$

The height direction vector generating section 444 generates a height direction vector $V_H$, using the unit vector $H_x$ in the height direction and the height displacement γ.

In the following description, $C_h$ represents the current position of the scanning probe 2 in the height direction and $Z_h$ represents the fixed Z-coordinate value that is specified for a specified region.

$V_h$ represents the control gain in the height direction.

$(X_u, Z_u)$ represents the inner product.

The push-in control gain $V_e$ and the height control gain $V_h$ operate as so many control parameters.

height direction vector $\vec{V}_H = V_h \cdot \gamma \cdot \vec{H}_x$ where $$\vec{H}_x = \frac{\vec{X}_u}{(\vec{X}_u, \vec{Z}_u)}$$

$$\vec{X}_u = \vec{P}_u \times \vec{E}_u$$

$$\gamma = C_h - Z_h$$

The vector synthesizing section 445 generates the scanning vector $V_C$ by synthesizing the moving direction vector $V_P$, the push-in direction vector $V_E$ and the height direction vector $V_H$.

scanning vector $\vec{V}_C = \vec{V}_P + \vec{V}_E + \vec{V}_H$

Since the scanning vector $V_C$ is generated in this way, the relative position of the scanning probe 2 is always so controlled as to be held in a predetermined range that is constantly centered at the reference position. In other words, the push-in quantity is so controlled as to show a constant value.

Note that the moving speed $V_s$ may alternatively be controlled by the moving speed adjusting section 442A according to the push-in displacement a and the height displacement γ. Then, the moving speed $V_s$ is multiplied by a speed factor $SP_D$, which is equal to either the speed factor $SP_E$ that is determined according to the push-in displacement a or the speed factor $SP_H$ that is determined according to the height displacement γ, whichever smaller.

Figure 6:
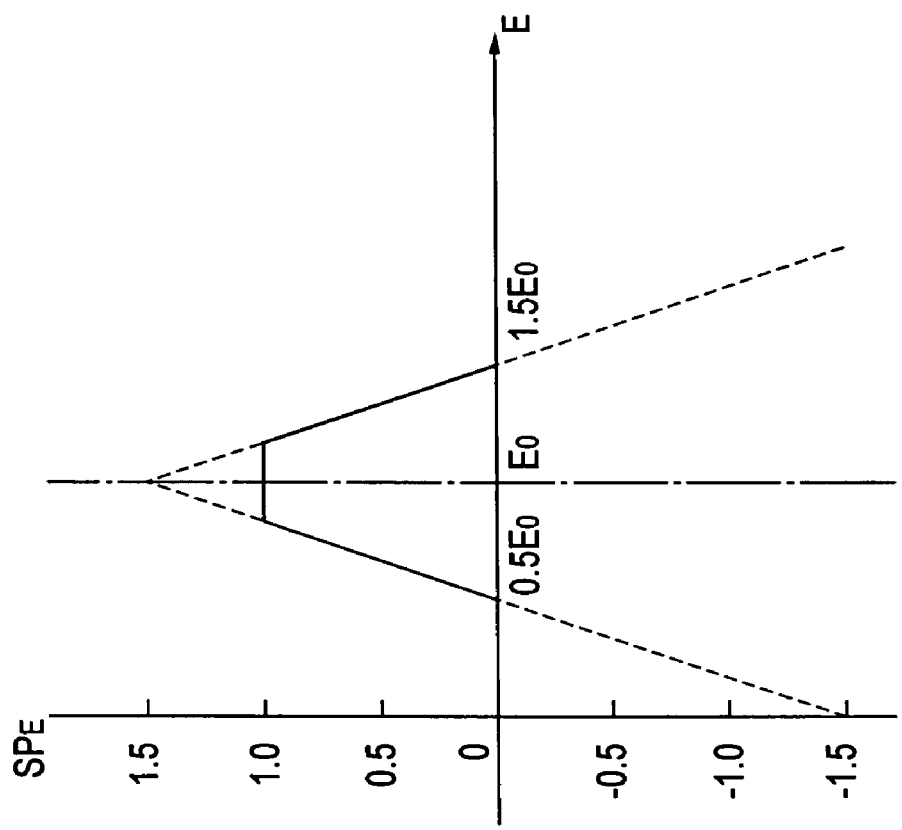
FIG. 6 is a graph illustrating the relationship of the push-in quantity and the adjustment of the moving speed of the scanning probe according to the first embodiment.
Figure 7:
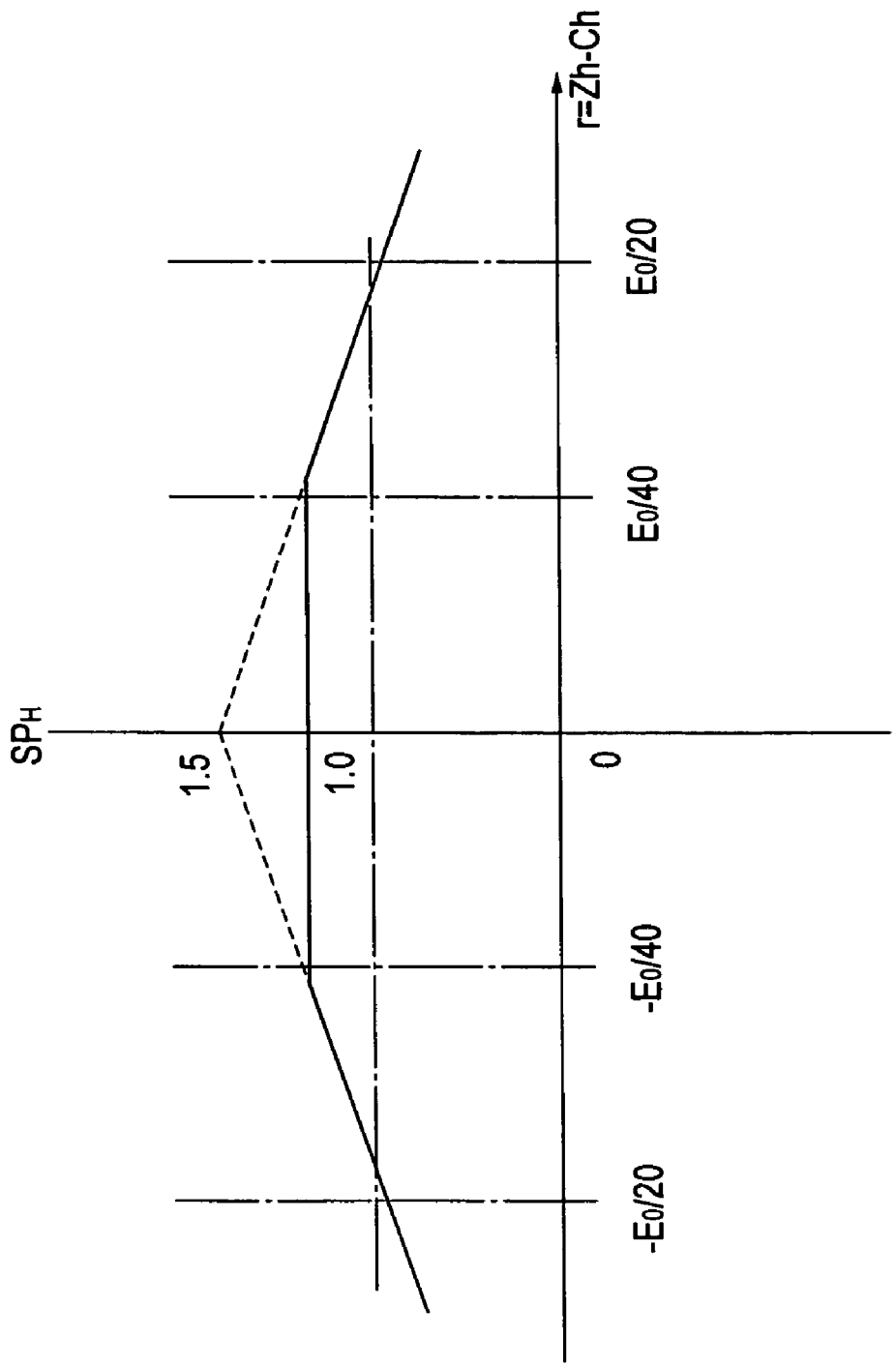
FIG. 7 is a graph illustrating the relationship of the discrepancy of the height and the adjustment of the moving speed of the scanning probe according to the first embodiment.

FIG. 6 illustrates the relationship between the push-in quantity E and the speed factor $SP_E$ and FIG. 7 illustrates the relationship between the height displacement γ and the speed factor $SP_H$. While the horizontal axis in FIG. 6 represents the push-in quantity E, it can easily be reduced to the push-in displacement a on the basis of the relationship between the push-in quantity E and the reference push-in quantity $E_0$. Although not described in detail, as the push-in displacement a and the height displacement γ increase the moving speed $V_s$ is so adjusted as to become lower.

The moving direction vector $V_P$ that includes the speed control according to the speed factor $SP_D$ is expressed by the formula below, in which θ represents the angle between the normal line to plane S defined by fixing the Z-coordinate to a constant value and the stylus 21.

moving direction vector $\vec{V}_P = SP_D \cdot V_S \cdot \vec{P}_u$ where $$SP_D = \min\{SP_E, SP_H\}$$

$$SP_E = \frac{1.5 - (E_0 - |E|) \times 3}{E_0}$$

$$SP_H = \frac{1.5 - (Z_h - C_h)}{\cos\theta \cdot E_0 \cdot 0.06}$$

When the vector generated by the autonomous scanning vector generating section 441 is generated as a vector on the work coordinate system, the vector on the work coordinate system is converted into a vector on the machine coordinate system by coordinate system converting section 446. Such a conversion is expressed by the formula below, using a predetermined conversion matrix [A]. On the following description, $V_W$ represents the scanning vector generated on the work coordinate system and $V_M$ represents the scanning vector obtained by converting the $V_W$ to a vector on the machine coordinate system.

$$\vec{V}_M = [A] \vec{V}_W$$

As shown in FIG. 3, the host computer 5 has an error determining section (relative position determining section) 51 for judging if the push-in quantity (positional deviation) is adequate or not by determining the positional deviation from the difference between the relative position and the reference position and comparing the position deviation and the marginal positional deviation, a measurement data storage section 52 for acquiring the data counted by the drive counter 411 and the probe counter 415 at a predetermined sampling pitch and storing them as measurement data, a specified region judging section 53 for judging if the current measuring position is in the specified region or not on the basis of the data stored in the measurement data storage section 52, a measurement condition deciding section 54 for deciding the moving speed of the scanning vector and the sampling pitch that match the surface condition of the workpiece W, a measurement condition storage section 55 for storing the measurement condition or the like defined and input at the input section 7, a form analyzing section 56 for analyzing the form of the workpiece W on the basis of the sampled measurement data and a central processing unit 57 for controlling the entire host computer 5.

The error judging section 51 judges the push-in state of the scanning probe 2 by comparing the positional deviation and the marginal positional deviation (marginal comparison/judgment) and outputs an error signal when the push-in quantity is in an error state. The error judging section 51 includes a retry operation commanding section (measurement mode switching section) 511 that commands a retry operation of drawing the scanning probe 2 back to an appropriate position and making it operate for scanning once again when the push-in quantity is in an error state.

The measurement data storage section 52 includes a control sampling point storage section 521 that acquires cyclically the count value of the counter section 41 at a short cycle period and temporarily stores it and a measurement sampling point storage section 522 that acquires data from the data stored in the control sampling point storage section 521 at intervals of the sampling pitch and stores them for a long time.

Figure 8:
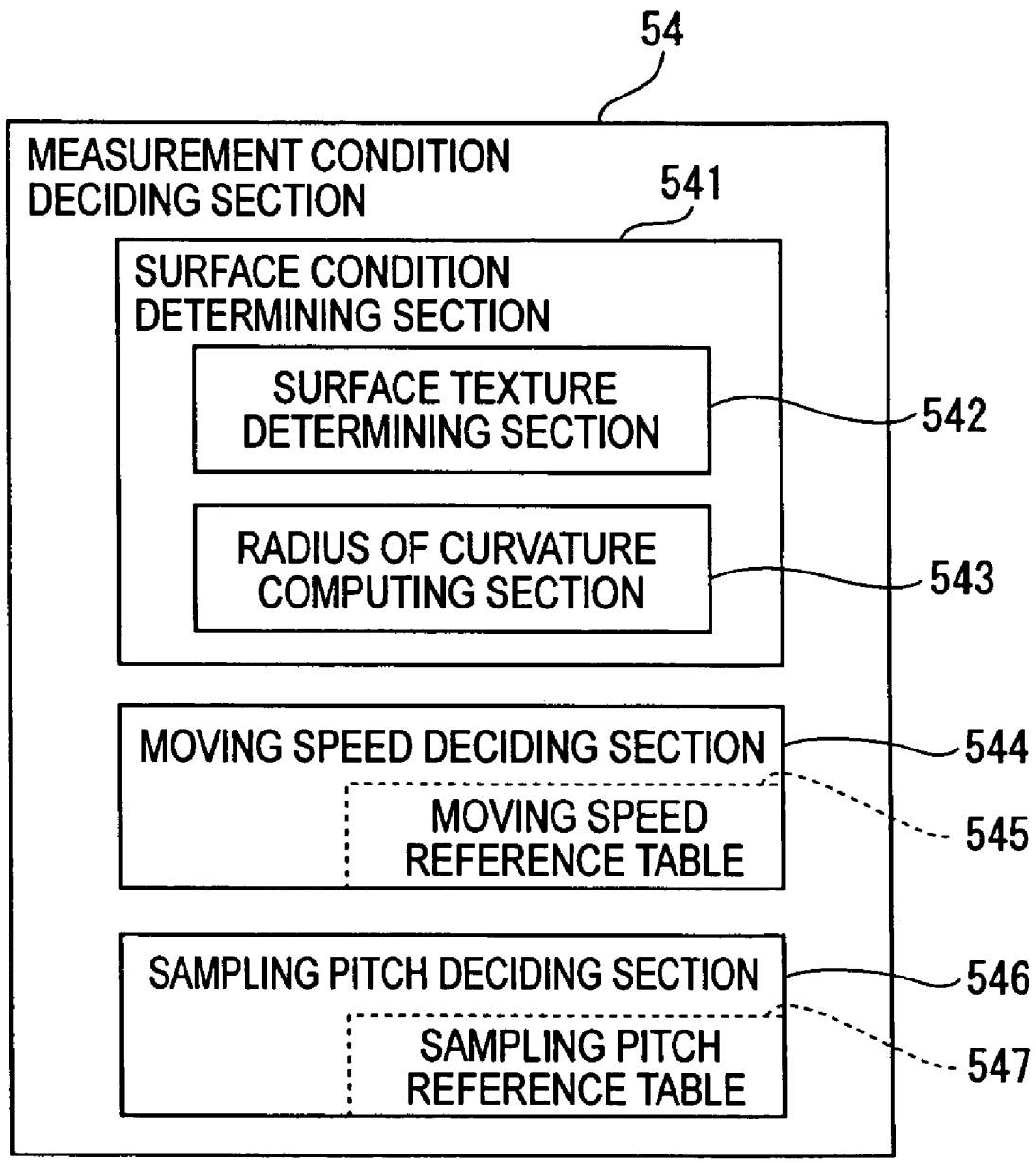
FIG. 8 is a schematic illustration showing the configuration of a measurement condition deciding section according to the first embodiment.

As shown in FIG. 8, the measurement condition deciding section 54 includes a surface condition determining section 541 for determining the surface condition at the scanning point, a moving speed deciding section 544 for deciding the moving speed of the scanning probe 2 according to the determination of the surface condition determining section 541 and a sampling pitch deciding section 546 for deciding the sampling pitch according to the determination of the surface condition determining section 541.

The surface condition determining section 541 includes a surface texture determining section 542 for determining the roughness of the surface (the surface texture) of the workpiece at the scanning point and a radius of curvature computing section 543 for computing the radius of curvature of the surface of the workpiece at the scanning point.

The surface texture determining section 542 determines the surface texture on the basis of the dispersion of data stored in the control sampling point storage section 521 and determines the surface roughness within a range of, for example several points (e.g., five points), on the basis of the distances from the line obtained by linearly regressing the several points from the current scanning point to respective data points. When determining the surface roughness, for example, the surface texture may be determined as "coarse" when the greatest value of the distances exceeds a predetermined threshold value and as "smooth" when the largest value of the distances is not greater than the predetermined threshold value. The result of determination is output to the moving speed deciding section 544 and the sampling pitch deciding section 546.

Figure 15:
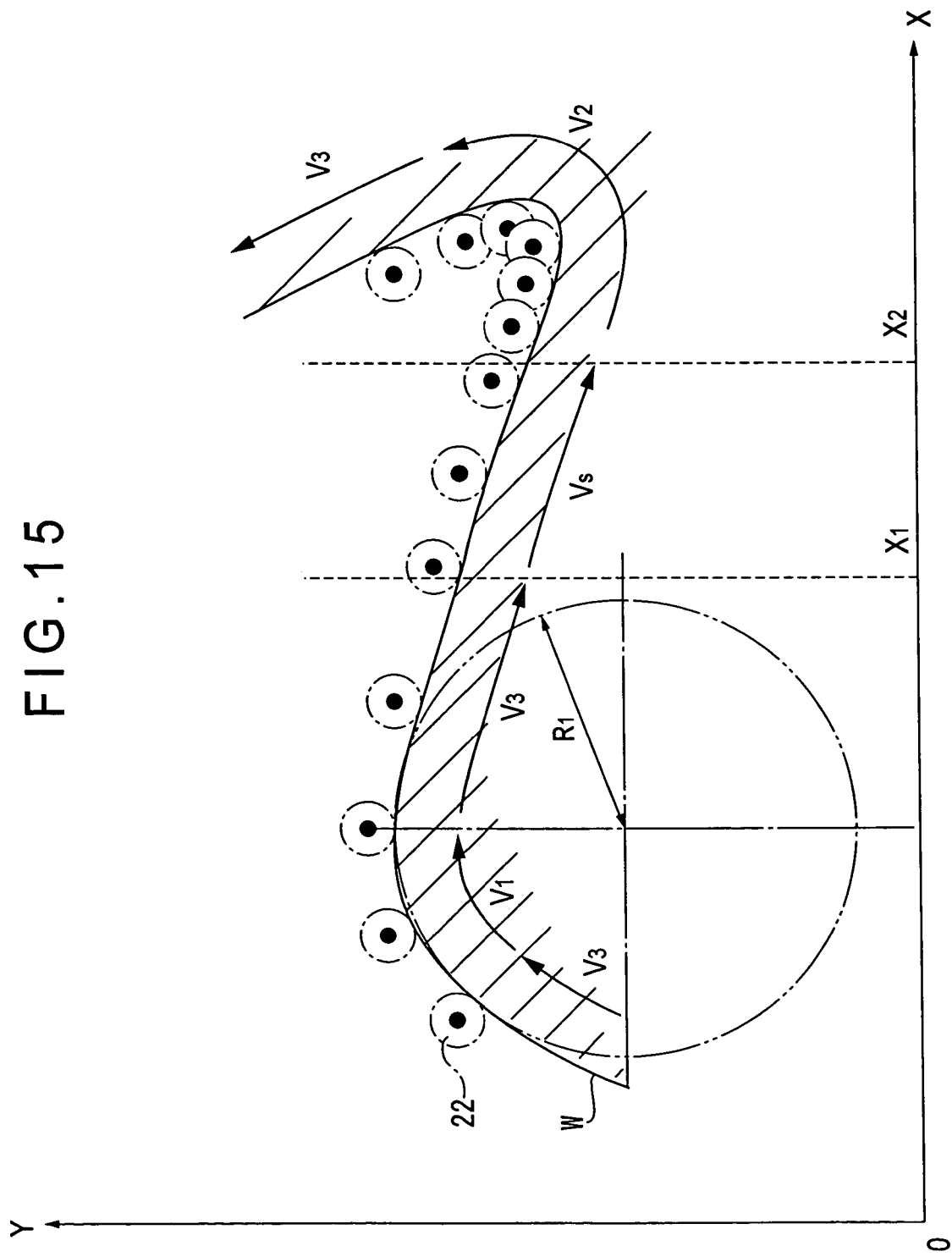
FIG. 15 is a schematic illustration showing how the scanning probe scans the surface of the workpiece while adjusting the moving speed, according to the first embodiment.

The radius of curvature computing section 543 computes the radius of curvature of the current scanning point on the basis of the data stored in the control sampling point storage section 521 (see FIG. 15).

When computing the radius of curvature, for instance, the radius of the circle passing through arbitrarily selected three points within the range of several points (e.g., five points) may be used as radius of curvature if the three points are selected from the several points. Alternatively, a smoothing curve may be obtained by processing data points by a low-pass filter within a range of several points (e.g., five points) and the radius of curvature of the current scanning point may be computed on the basis of the smoothing curve. In other words, the reciprocal of the differential coefficient of the second order of the smoothing curve at the scanning point may be computed. Still alternatively, the radius of curvature of each control sampling point may be computed on the basis of the smoothing curve and the average of the values of radius of curvature at the control sampling points may be used as radius of curvature at the current scanning point.

The computed radius of curvature is output to the moving speed deciding section 544 and the sampling pitch deciding section 546.

Figure 9:
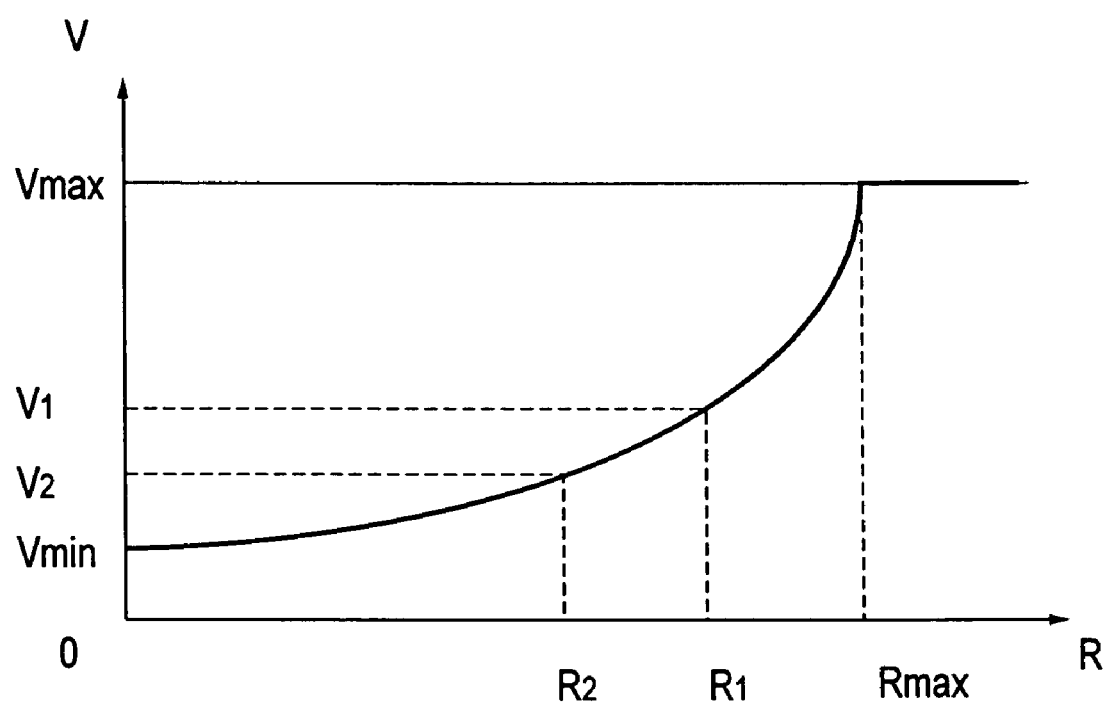
FIG. 9 is a graph illustrating the relationship of the radius of curvature of the surface of the workpiece and the moving speed of the scanning probe according to the first embodiment.

The moving speed deciding section 544 decides the moving speed of the scanning probe according to the result of determination of the surface texture of the surface texture determining section 542 and the radius of curvature computed by the radius of curvature computing section 543. The moving speed deciding section 544 is equipped with a moving speed reference table 545 that defines the relationship between the moving speed and the radius of curvature computed by the radius of curvature computing section 543. The moving speed reference table 545 typically shows a relationship that makes the moving speed monotonously increase as an exponential function of the radius of curvature R but to be fixed it to a constant value (Vmax) when the radius of curvature R gets to a predetermined value (Rmax) as shown in FIG. 9. The range of the moving speed V may be, for example, between 100 µm/s and 150,000 µm/s (0.1 mm/s and 150 mm/s).

The moving speed deciding section 544 firstly reads out the moving speed defined on the moving speed reference table 545 relative to the radius of curvature R computed by the radius of curvature computing section 543 (the moving speed according to the radius of curvature) and subsequently adjusts the moving speed read out from the moving speed reference table 545 (the moving speed according to the radius of curvature) according to the result of determination of the surface texture determining section 542. For example, the moving speed deciding section 544 multiplies the moving speed according to the radius of curvature by adjustment coefficient e (e<0.5) if the surface texture determining section 542 determines that the surface is "coarse", whereas it multiplies the moving speed according to the radius of curvature by adjustment coefficient ζ (0.5≦ζ<1) if the surface texture determining section 542 determines that the surface is "smooth". Note, however, that the adjustment coefficients e and ζ may be appropriately defined. The moving speed decided by the moving speed deciding section 544 is then output to the autonomous scanning vector generating section 441 (the moving direction vector generating section 442 to be more specific).

FIG. 15 illustrates how the moving speed V is adjusted as the radius of curvature changes.

Figure 10:
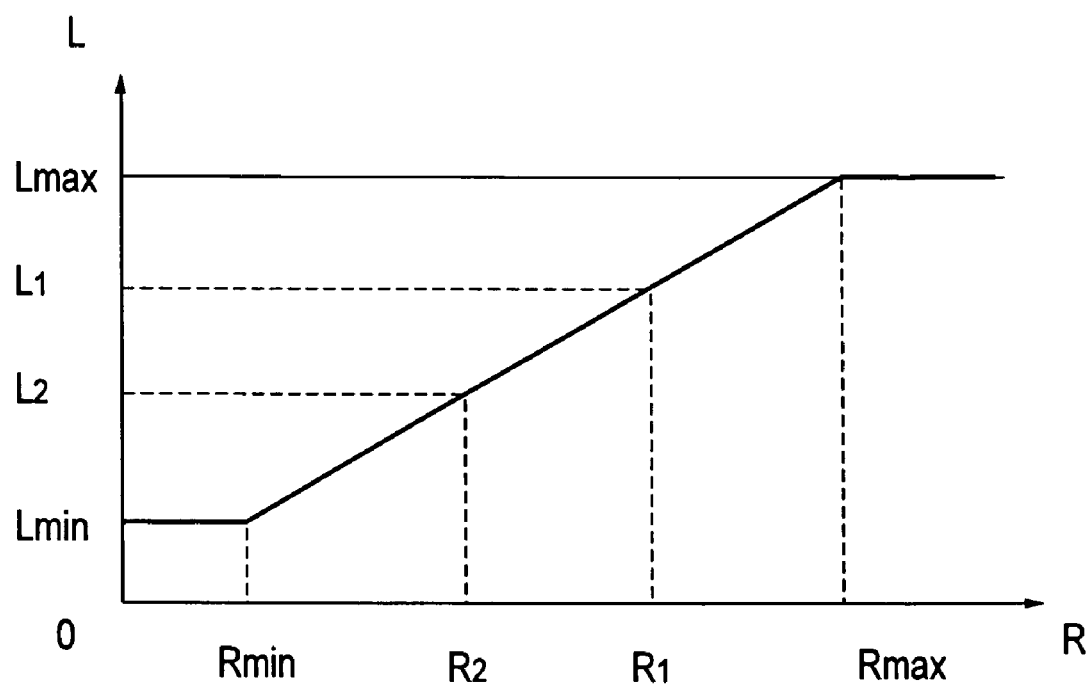
FIG. 10 is a graph illustrating the relationship of the radius of curvature of the surface of the workpiece and the sampling pitch according to the first embodiment.

The sampling pitch deciding section 546 decides the sampling pitch for sampling the measurement data according to the result of determination of the surface texture determining section 542 on the surface texture and the radius of curvature computed by the radius of curvature computing section 542. The sampling pitch deciding section 546 is quipped with a sampling pitch reference table 547 that defines the relationship between the sampling pitch and the radius of curvature computed by the radius of curvature computing section 543. The sampling pitch reference table 547 typically shows a relationship that makes the sampling pitch monotonously increase as a linear function of the radius of curvature R but to be fixed it to a constant value (Lmax) when the radius of curvature R gets to a predetermined value (Rmax) as shown in FIG. 10. The range of the sampling pitch may be, for example, between 0.01 mm and 10 mm.

The sampling pitch deciding section 546 firstly reads out the sampling pitch defined on the sampling pitch reference table 547 relative to the radius of curvature R computed by the radius of curvature computing section 543 (the sampling pitch according to the radius of curvature) and subsequently adjusts the sampling pitch according to the radius of curvature R according to the result of determination of the surface texture determining section 542. For example, the sampling pitch deciding section 546 multiplies the sampling pitch according to the radius of curvature by adjustment coefficient κ (κ<0.5) if the surface texture determining section 542 determines that the surface is "coarse", whereas it multiplies the sampling pitch according to the radius of curvature by adjustment coefficient λ (0.5≦λ<1) if the surface texture determining section 542 determines that the surface is "smooth". Note, however, that the adjustment coefficients κ and λ may be appropriately defined.

The sampling pitch deciding section 546 then outputs the adjusted sampling pitch to the measurement data storage section 52 along with a control sampling pitch that is shorter than the sampling pitch.

While the value of the control sampling pitch is not specifically limited, it may typically be 1/5 of the sampling pitch.

Figure 16:
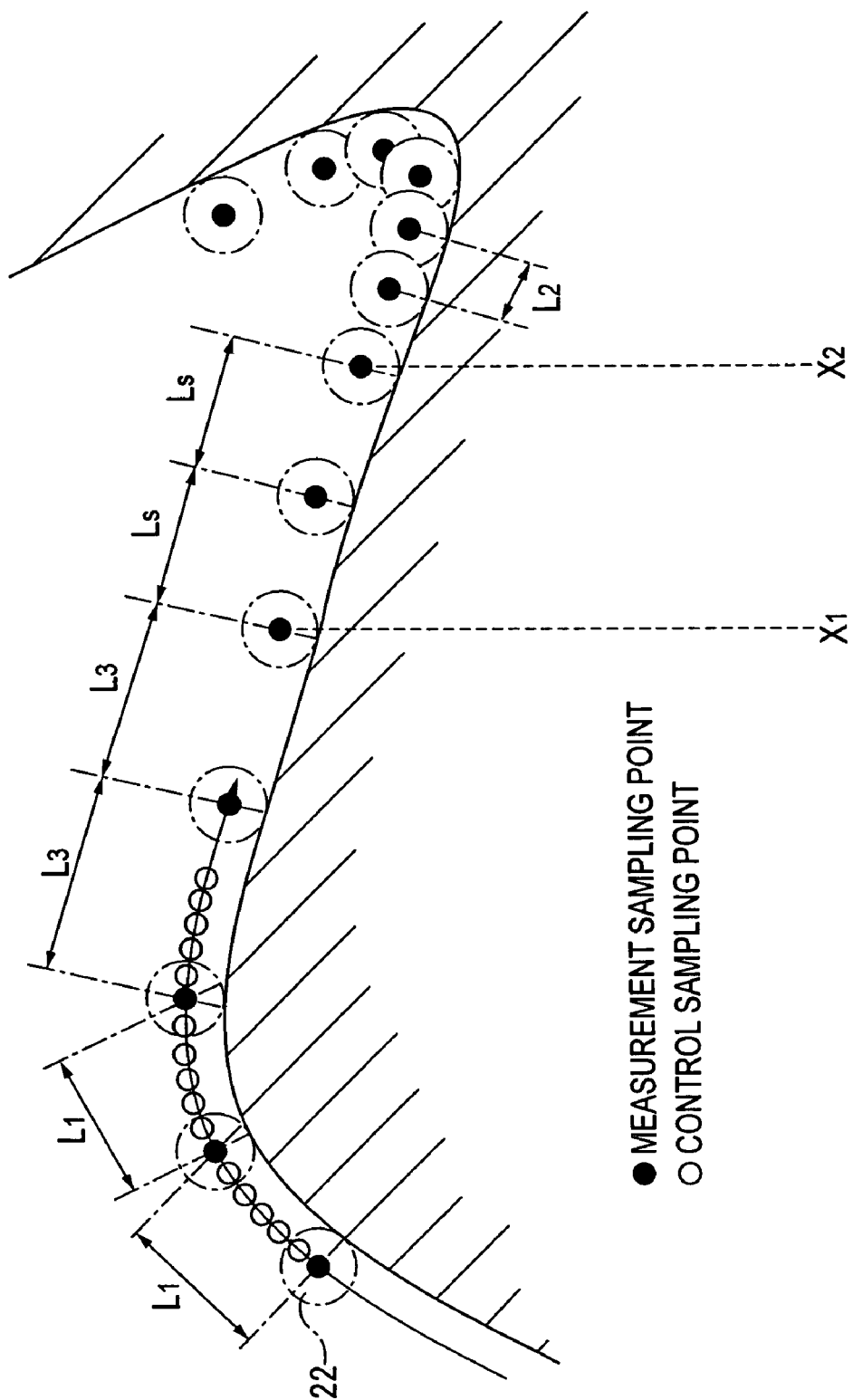
FIG. 16 is a schematic illustration showing how the scanning probe scans the surface of the workpiece while adjusting the sampling pitch, according to the embodiment.

FIG. 16 illustrates how the sampling pitch is adjusted as the radius of curvature changes.

The measurement condition storage section 55 stores the measurement conditions input from the input section 7 in advance when starting a measuring operation. Examples of data defined and input to the measurement condition storage section 55 include measurement parameters such as the reference push-in quantity, the range of measurement, the specified region, the specified speed and the specified pitch and initial values including servo control parameters such as the servo control gain set in the drive control circuit 45 and scanning control parameters such as the push-in control gain $V_e$.

The reference push-in quantity (reference position) is the quantity by which the scanning probe 2 is pushed into the surface of the workpiece for a scanning operation. The push-in quantity (relative to position) |E| is defined by the formula below in terms of the values (Xp, Yp, Zp) detected by the probe counter 415.

$$|\vec{E}|=\sqrt{Xp^2+Yp^2+Zp^2}$$

The range of measurement is the range of the workpiece W to be measured and the specified region is the region in the range of measurement that is specified so as to be measured at the specified moving speed and the specified sampling pitch that are specified in advance. The measurement conditions decided by the measurement condition deciding section 54 are not applied to the specified region. The specified speed and the specified sampling pitch are specified as the moving speed and the sampling pitch for the initial measurement or for the measurement in the specified region.

[Surface Scan Measuring Method]

Now, the surface scan measuring method will be described by referring to the flow charts of FIGS. 11 through 14. FIGS. 15 and 16 show how the scanning probe 2 scans the surface of the workpiece.

Figure 11:
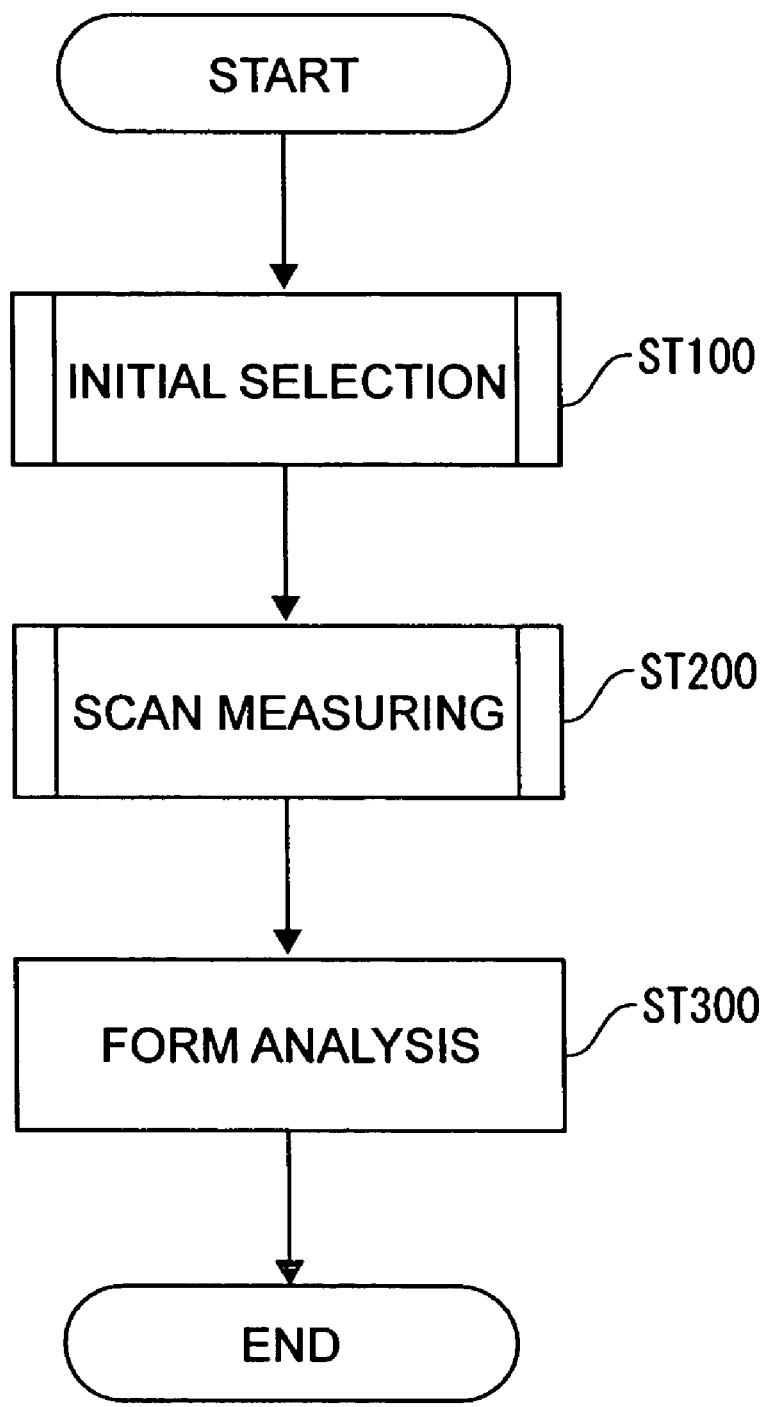
FIG. 11 is a flow chart showing the sequence of a surface scan measuring method according to the first embodiment.

As shown in the flow chart of FIG. 11, the surface scan measuring method includes an initial selection step (ST100) of selecting a measurement mode and inputting measurement conditions, a scan measuring step (ST200) of obtaining measurement data by a scan measuring operation, using the measuring system 100 and a form analyzing step (ST300) of analyzing the form of the workpiece on the basis of the measurement data obtained by the measurement. Note that, a result of the analyzed form is output through the output section 6.

Figure 12:
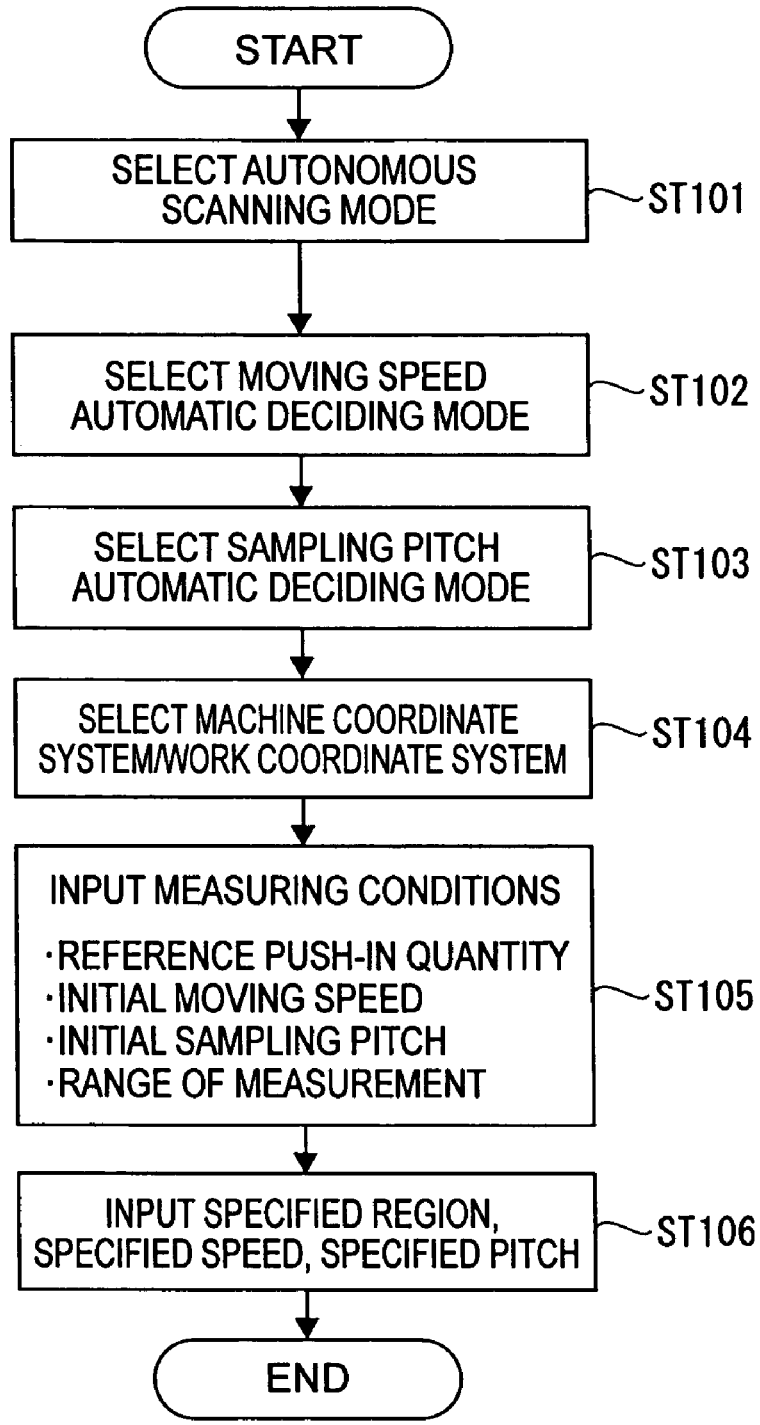
FIG. 12 is a flow chart showing the sequence of an initial selection process according to the first embodiment.

Firstly, initial selection step (ST100, FIG. 11) will be described by referring to the flow chart of FIG. 12.

In ST101, the autonomous scanning mode is selected by an input operation of the input section 7. As the autonomous scanning mode is selected, an autonomous scanning vector is generated by the autonomous scanning vector generating section 441 and the scanning probe 2 autonomously scans the surface of the workpiece according to the command of the autonomous scanning vector.

In ST102, the moving speed automatic deciding mode is selected (ON) and subsequently, in ST103, the sampling pitch automatic deciding mode is selected (ON). As the moving speed automatic deciding mode is selected, the autonomous scan measuring operation is conducted according to the moving speed decided by the moving speed deciding section 544 and, as the sampling pitch automatic deciding mode is selected, measurement data are obtained at the sampling pitch decided by the sampling pitch deciding section 546.

In ST104, either the machine coordinate system or the work coordinate system is selected by the coordinate system selection switch 34 of the operating section 3. When the work coordinate system is selected, a work coordinate system is generated simultaneously. A work coordinate system is generated by measuring the coordinates of the three points specified on the surface of the workpiece and defining the normal line to the plane defined by the three points as Zw direction and directions that are orthogonal relative to each other on the plane as Xw direction and Yw direction. The generated work coordinate system is stored in the coordinate system setting section 42.

In ST105, measurement conditions (measurement parameters) are input. Examples of measurement conditions that are input include the reference push-in quantity and the initial moving speed of the scanning probe 2, the initial sampling pitch and the range of measurement.

Servo control parameters and scanning control parameters that are not illustrated may also be input. The initial measurement parameters and the initial control parameters that are input in this step are applied to the measurement condition deciding section 54 as initial values, while the servo control parameters such as the control gain necessary for controlling the drive mechanism 12 are set in the drive control circuit 45.

As the range of measurement, for example, the Zw coordinate value that is fixed when the scan measuring operation is conducted at a fixed height (the Zw coordinate value is fixed) may be input.

In ST106, the specified region is input along with the specified moving speed and the specified sampling pitch as the conditions to be met for scan measuring the specified region. As the specified region, for example, the range between X1 and X2 as shown in FIG. 15 may be specified.

Further, control parameters in the specified region may be input.

When the initial selection (ST100) is over, the method proceeds to the next scan measuring step (ST200).

Now, the scan measuring step (ST200) will be described below by referring to the flow chart of FIG. 13. FIG. 15 illustrates how the moving speed is adjusted as the radius of curvature of the surface of the workpiece changes. FIG. 16 illustrates how the sampling pitch is adjusted as the radius of curvature of the surface of the workpiece changes.

In ST201, the scanning probe 2 is moved to the measurement starting point of the workpiece W (approach step). Such an operation may be carried out by inputting the measurement starting point at the input section 7 so as to move the scanning probe 2 to the measurement starting point or by manually operating the joystick 32 of the operating section 3 so as to move the scanning probe 2 to the measurement starting point.

When the scanning probe 2 gets to the measurement starting point, an initial scanning operation is conducted in ST202. The initial scanning operation is carried out according to the scanning vector $V_C$ generated by the autonomous scanning vector generating section 441. At this time, the scanning operation is conducted not at the moving speed and the sampling pitch decided by the measurement condition deciding section 54 but at the initial moving speed and the initial sampling pitch input to the measurement condition storage section 55 (see ST105).

In ST203, control sampling points are acquired during the initial scanning operation (ST202) and stored in the control sampling point storage section 521.

In ST204, it is determined if five control sampling points are acquired or not. If five control sampling points are acquired (ST204: YES), the surface condition is subsequently determined by the surface condition determining section 541 in ST205 and ST206.

In ST205, the surface texture is determined by the surface texture determining section 542 according to the acquired five control sampling points. As described earlier, the texture of the surface of the workpiece is determined to be "coarse" or "smooth" at the scanning point on the basis of the dispersion of the control sampling points. The result of determination is output to the moving speed deciding section 544 and the sampling pitch deciding section 546.

In ST206, the radius of curvature of the surface of the workpiece is computed at the scanning point by the radius of curvature computing section 543 on the basis of the acquired five control sampling points and the computed radius of curvature is output to the moving speed deciding section 544 and the sampling pitch deciding section 546.

In ST207, the moving speed of the scanning operation is decided by the moving speed deciding section 544. In other words, the moving speed that corresponds to the radius of curvature computed by the radius of curvature computing section 543 is read out from the moving speed reference table 545 (see FIG. 9). Then, the moving speed decided according to the radius of curvature is adjusted according to the determination on the surface texture (ST205) to decide the moving speed of the scanning vector. The decided moving speed is output to the scanning vector commanding section 44.

In ST208, the sampling pitch of the scan measuring operation is decided by the sampling pitch deciding section 546. In other words, the sampling pitch that corresponds to the radius of curvature computed by the radius of curvature computing section 543 is read out from the sampling pitch reference table 547 (see FIG. 10). Then, the sampling pitch decided according to the radius of curvature is adjusted according to the determination on the surface texture (ST205) to decide the sampling pitch of the scan measuring operation. The decided sampling pitch is output to the measurement data storage section 52 and a pitch shorter than the sampling pitch (e.g., a pitch equal to 1/5 of the sampling pitch) is output also to the measurement data storage section 52 as control sampling pitch.

In ST209, a scanning vector is generated by the autonomous scanning vector generating section 441, using the moving speed decided by the moving speed deciding section 544 (ST207).

More specifically, when a moving direction vector $V_P$ is generated by the moving direction vector generating section 442, the moving speed decided by the moving speed deciding section 544 is used as the moving speed $V_s$. Then, the moving speed $V_s$ decided by the moving speed deciding section 544 is multiplied by a speed factor $SP_D$ that is selected depending on the push-in deviation and the height deviation in order to adjust the moving speed. Additionally, the push-in control gain $V_e$ is adjusted according to the moving speed $V_s$ by the push-in control gain adjusting section 443A of the push-in direction vector generating section 443. For example, a large push-in control gain is defined when the moving speed $V_s$ is small. If the scanning vector generated by the autonomous scanning vector generating section 441 is a vector on the work coordinate system, it is converted into a vector on the machine coordinate system by a predetermined conversion matrix.

In ST210, a scanning operation is conducted according to the scanning vector. More specifically, the control signal from the drive control circuit 45 is applied to the drive mechanism 12 in response to the command from the scanning vector commanding section 44 to drive the scanning probe 2 to scan the surface of the workpiece.

FIG. 15 illustrates how the scanning speed is adjusted as the radius of curvature changes. More specifically, the scanning operation is conducted at a high speed (V3) in a region where the radius of curvature is relatively large, whereas the scanning operation is conducted at a low speed (V1) in a region where the radius of curvature is relatively small. Additionally, the scanning operation is conducted at a very low speed (V2) in a region where the radius of curvature is very small.

In ST211, control sampling points are acquired during the scanning operation (ST210). At this time, an error judgment is made by the error judging section 51 (ST212). The error judgment (ST212) is made by determining if the push-in quantity is lower than the predetermined threshold value (marginal positional deviation) or not on the basis of the output values of the probe counter 415 for the data acquired by the counter section 41 as control sampling points. When a positive decision is made on non-error (ST212: YES), the control sampling points are stored in the control sampling point storage section 521.

Then, in ST213, it is judged if the scanning point is in the specified region or not by the specified region judging section 53. More specifically, it is judged if the scanning point is in the specified region input to the measurement condition storage section 55 or not and, if the scanning point is out of the specified region (ST213: YES), the scanning operation is allowed to continue.

In ST214, it is determined if the current scanning point advances from the last sampling point by the sampling pitch or not. If it is determined that the current scanning point advances by the sampling pitch (ST214: YES), the output value of the counter section 41 is stored in the measurement sampling point storage section 522 as measurement sampling point.

FIG. 16 illustrates how the sampling pitch and the control sampling pitch are adjusted as the radius of curvature changes. More specifically, measuring points are acquired at a wide sampling pitch (L3) in a region where the radius of curvature is relatively large, whereas measuring points are acquired at a narrow sampling pitch (L1) in a region where the radius of curvature is relatively small. Additionally, measuring points are acquired at a very narrow sampling pitch (L2) in a region where the radius of curvature is very small.

In ST216, it is judged if the terminating condition is met or not. For example, the scan measuring operation is terminated when the specified region is entirely scanned and measured (ST216: YES).

If five control sampling points are not acquired in ST204 (ST204: NO), the surface scan measuring method returns to ST202 and continues the scanning operation.

When a negative decision is made on non-error in ST212 (ST212: NO), the retry operation commanding section 511 of the error judging section 51 issues a retry command to the scanning vector commanding section 44 and a retry operation (ST217) is carried out.

Figure 14:
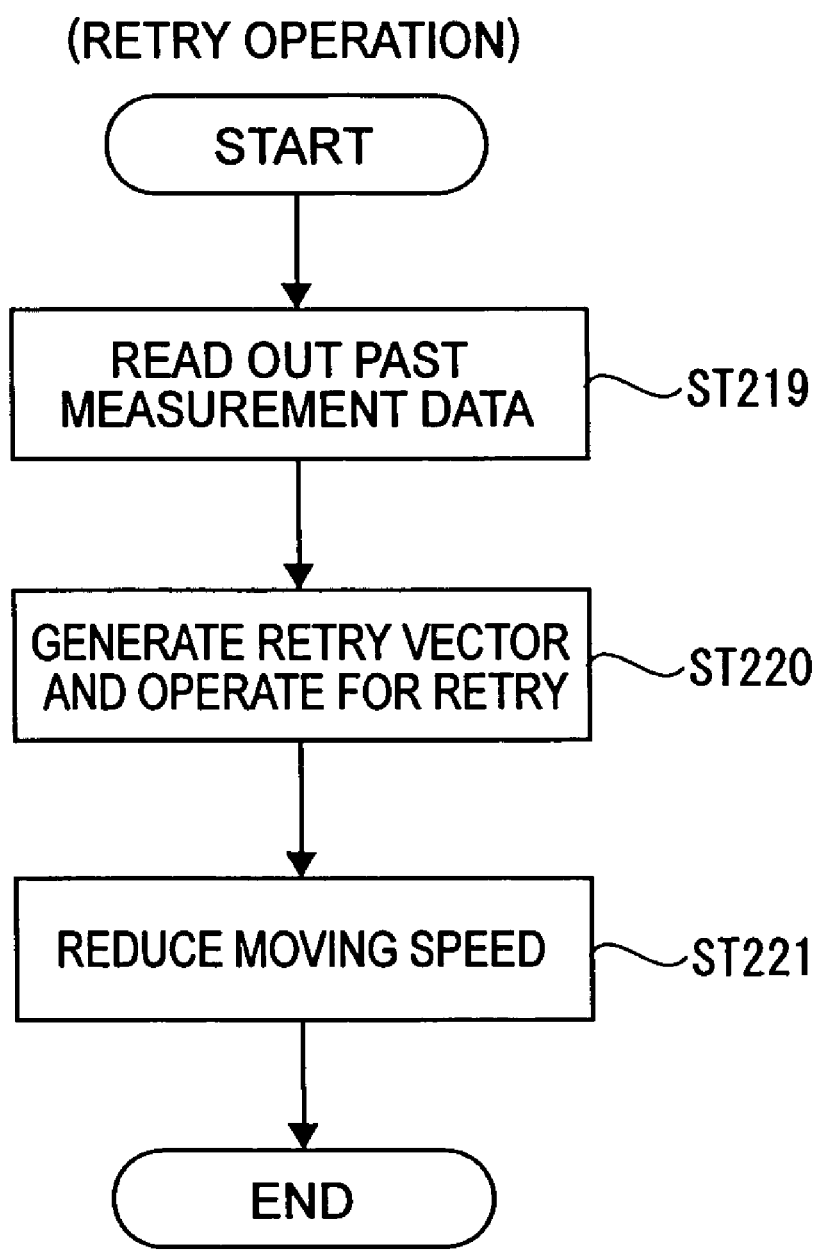
FIG. 14 is a flow chart showing the sequence of a retry operation according to the first embodiment.

Now, the retry operation will be described by referring to the flow chart of FIG. 14.

As a command for a retry operation is issued according to the negative decision on non-error (ST212: NO), the scanning vector commanding section 44 reads out measurement data stored in the measurement data storage section 52 in ST219. The measurement data (control sampling point or measurement sampling point) read out by the scanning vector commanding section 44 are those acquired before the negative decision is made on non-error (ST212: NO). For example, they may be the last measurement data acquired normally or the measurement data acquired at the last several measuring points.

In ST220, a retry vector is generated by the autonomous scanning vector generating section 441. A retry vector is a vector for moving the scanning probe 2 toward a measuring point of coordinate values that make it turn back from the current measuring point. Thus, the scanning probe is made to turn back by the retry vector.

Subsequently, in ST221, the moving speed $V_s$ is reduced by the moving direction vector generating section 442. In other words, the current moving speed specified by the moving speed deciding section 544 is reduced. For example, the moving speed may be reduced by a reducing ratio of about 50%.

After the scanning probe 2 is made to turn back from the current measuring point and its moving speed is reduced, the surface scan measuring method returns to ST209 and resumes the scanning operation.

If it is judged that the current scanning point is in the specified region by the specified region judging section 53 (ST213: NO), the specified speed and the sampling pitch that are stored in the measurement condition storage section 55 are read out to replace the moving speed and the sampling pitch decided by the measurement condition deciding section 54 (ST218) and the scanning operation is conducted at the specified moving speed and the specified sampling pitch.

At this time, if the servo control parameters in the specified region are defined, they are read out to replace the parameters set in the drive control circuit 45.

If the push-in control gain in the specified region is defined, its value is read out and the scanning vector is computationally determined by the scanning vector commanding section 44 on the basis of the read out value.

If it is judged that the scanning point moves from the inside of the specified region to the outside thereof, the measurement parameters and the control parameters that are used immediately before entering the specified region are reused. One or more than one of the initial measurement parameters and the initial servo control parameters may be reused at this time.

The scanning operation is conducted and measurement data are acquired at the specified moving speed $V_s$ and the specified sampling pitch $L_S$ in the specified region X1-X2 in FIGS. 15 and 16.

If it is determined in ST214 that the current scanning point does not advance by the sampling pitch (ST214: NO), the scanning operation is continued under the current measurement conditions (in terms of the moving speed and the sampling pitch).

If it is judged in ST216 that the terminating condition is not met (ST216: NO), the surface scan measuring method returns to ST205, where it updates the moving speed and the sampling pitch to generate an autonomous scanning vector and then continues the scanning operation.

After terminating the scan measuring operation ST200, the form of the workpiece is analyzed by the form analyzing section 56 on the basis of the acquired measurement sampling points (FIG. 11, ST300).

The above-described first embodiment provides the following advantages.

(1) Since the surface scan measuring device scans the surface of a workpiece, while searching the surface by the autonomous scanning vector generated by the autonomous scanning vector generating section 441, it can scan and measure the surface of a workpiece whose form is unknown. Then, since the measurement parameters such as the moving speed and the sampling pitch of the scanning probe 2 and the control parameters are incessantly adjusted by the measurement condition deciding section 54, the workpiece whose form is unknown is always scanned under optimal scanning conditions (adaptive measurement control condition) and an optimal number of measurement data is acquired. In other words, the workpiece whose form is unknown can be scanned in the shortest possible time period and the form of the workpiece can be analyzed on the basis of an optimal number of measurement data that is sufficient but not excessive.

(2) The moving speed (measurement parameter) of the scanning probe is adjusted by the moving speed deciding section 544 on the basis of the radius of curvature (surface condition) of the surface of the workpiece that is computed by the radius of curvature computing section 543. Therefore, the scanning operation is conducted at high speed and hence it is completed within a short period of time on a workpiece that shows a large radius of curvature.

The moving speed is adjusted to a lower level where the radius of curvature shows a small value so that errors such as excessive push-in and breakaway of the scanning probe 2 can hardly occur and the scanning operation proceeds smoothly. As a result, the scanning operation is not suspended due to errors such as excessive push-in and breakaway of the scanning probe. Then, the time required for the scanning operation is reduced and the scanning probe 2 is prevented from being damaged.

(3) The sampling pitch (measurement parameter) is adjusted by the sampling pitch deciding section 546 on the basis of the radius of curvature of the surface of the workpiece as computed by the radius of curvature computing section 543. Therefore, the number of measurement sampling points is so adjusted that it is reduced in a region where the surface of the workpiece shows a large radius of curvature but increased in a region where the surface of the workpiece shows a small radius of curvature. Thus, the form of the workpiece is analyzed on the basis of an optimal quantity of data. Since data are not acquired excessively, the time required for the scan measuring operation is reduced.

(4) The error judging section 51 judges if there is an error in the scanning operation and, if there is an error, the scanning probe is made to turn back to the last point where it normally acquired data for a retry operation (ST217) and resume the scanning operation. Thus, the scan measuring operation is not suspended because of a measurement unable condition. Additionally, the scanning probe 2 is made to turn back according to an error decision before a fatal error such as errors of excessive push-in or breakaway of the scanning probe 2 takes place so that the scanning probe 2 is prevented from being damaged.

(5) Specified regions are specified and the scanning probe is defined appropriately depending on the workpiece. For example, a narrow sampling pitch is defined in advance for a region that needs to be measured accurately and a wide sampling pitch is defined in advance for a region that does not require a high accuracy level. Then, the time required for measuring a region that does not require a high accuracy level is reduced if compared with time required for measuring a region that needs to be measured accurately. Additionally, when a region of the surface of the workpiece that shows a small radius of curvature is specified as specified region, it is possible to prevent the scanning probe 2 from being damaged due to errors such as excessive push-in and breakaway.

(6) The surface texture is determined by the surface texture determining section 542 and the moving speed and the sampling pitch are adjusted according to the degree of roughness of the surface of the workpiece. Therefore, a large number of measurement data are acquired for a region showing a coarse surface and hence the form thereof is analyzed accurately, whereas the scanning operation proceeds at high speed in a smooth region to reduce the time required for the scan measuring operation in the region.

(7) The moving speed decided by the moving speed deciding section 544 is adjusted by the moving speed adjusting section 442A depending on the push-in deviation (positional deviation) and the height deviation. Then, the scanning operation proceeds at high speed in a smooth region whereas it goes on at low speed in a region showing a small radius of curvature where push-in deviations (positional deviations) and/or height deviations can easily occur so that errors such as excessive push-in or breakaway are reliably prevented from taking place.

(8) The push-in control gain (control parameter) is adjusted by the push-in control gain adjusting section 443A according to the moving speed decided by the moving speed deciding section 544. Thus, the push-in control gain is adjusted to show a large value to improve the tracing performance when the moving speed is low. In other words, the push-in control is conducted carefully in a region where excessive push-in and/or breakaway can highly probably take place so that errors such as excessive push-in and breakaway are reliably avoided and the scanning operation is conducted very smoothly.

Second Embodiment

Now, the second embodiment of surface scan measuring device and that of surface scan measuring method will be described below.

The second embodiment is identical with the first embodiment in terms of the basic configuration thereof. However, the second embodiment is characterized in that it is adapted to trajectory scanning.

Figure 17:
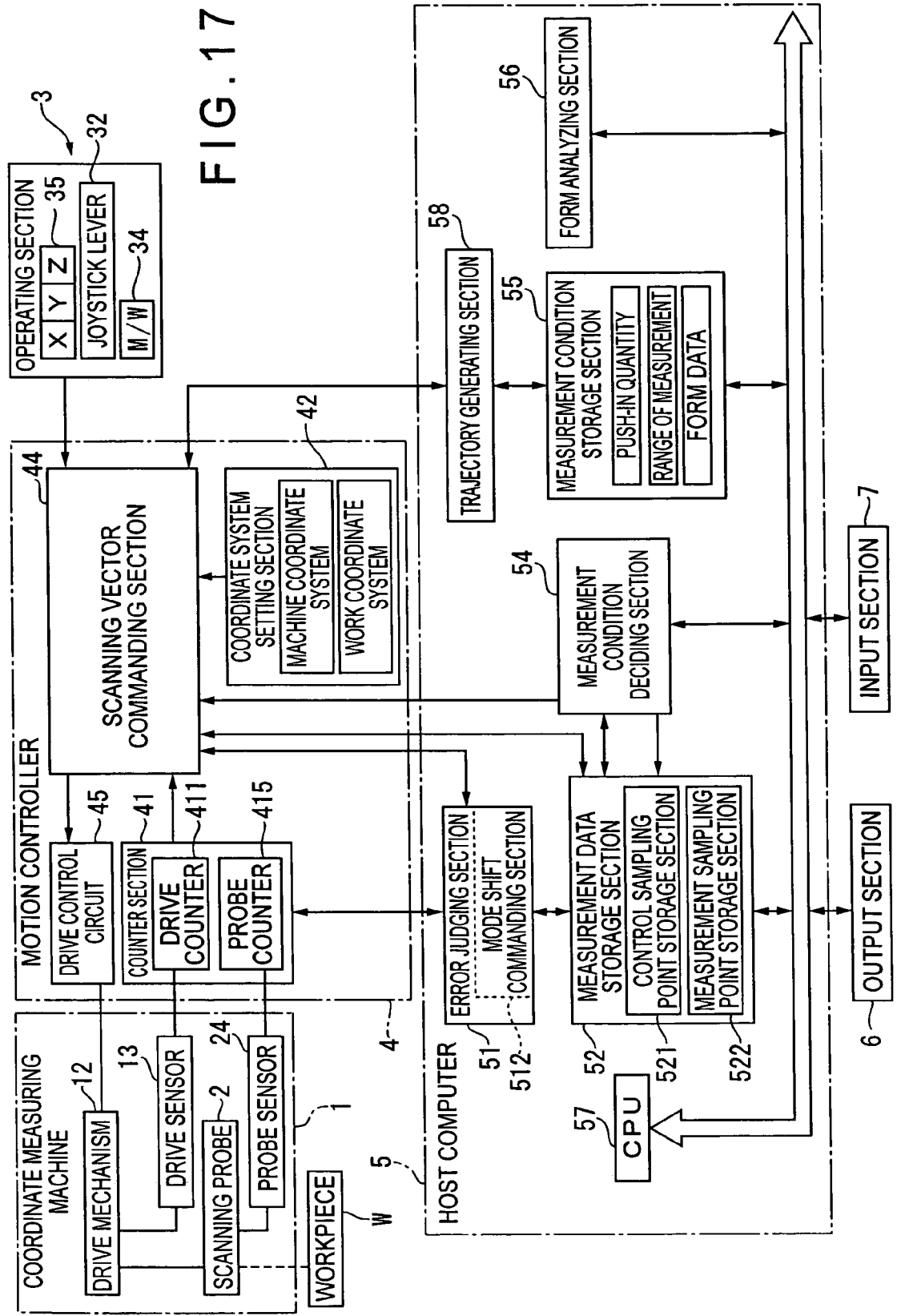
FIG. 17 is a block diagram showing the function of a measuring system according to a second embodiment of the present invention.

FIG. 17 shows a functional block diagram of the second embodiment.

Referring to FIG. 17, the host computer 5 includes a trajectory generating section 58 and the measurement condition storage section 55 receives form data of the workpiece W as input. The host computer 5 also includes an error judging section 51, which error judging section 51 by turn includes a mode shift commanding section 512.

Figure 18:
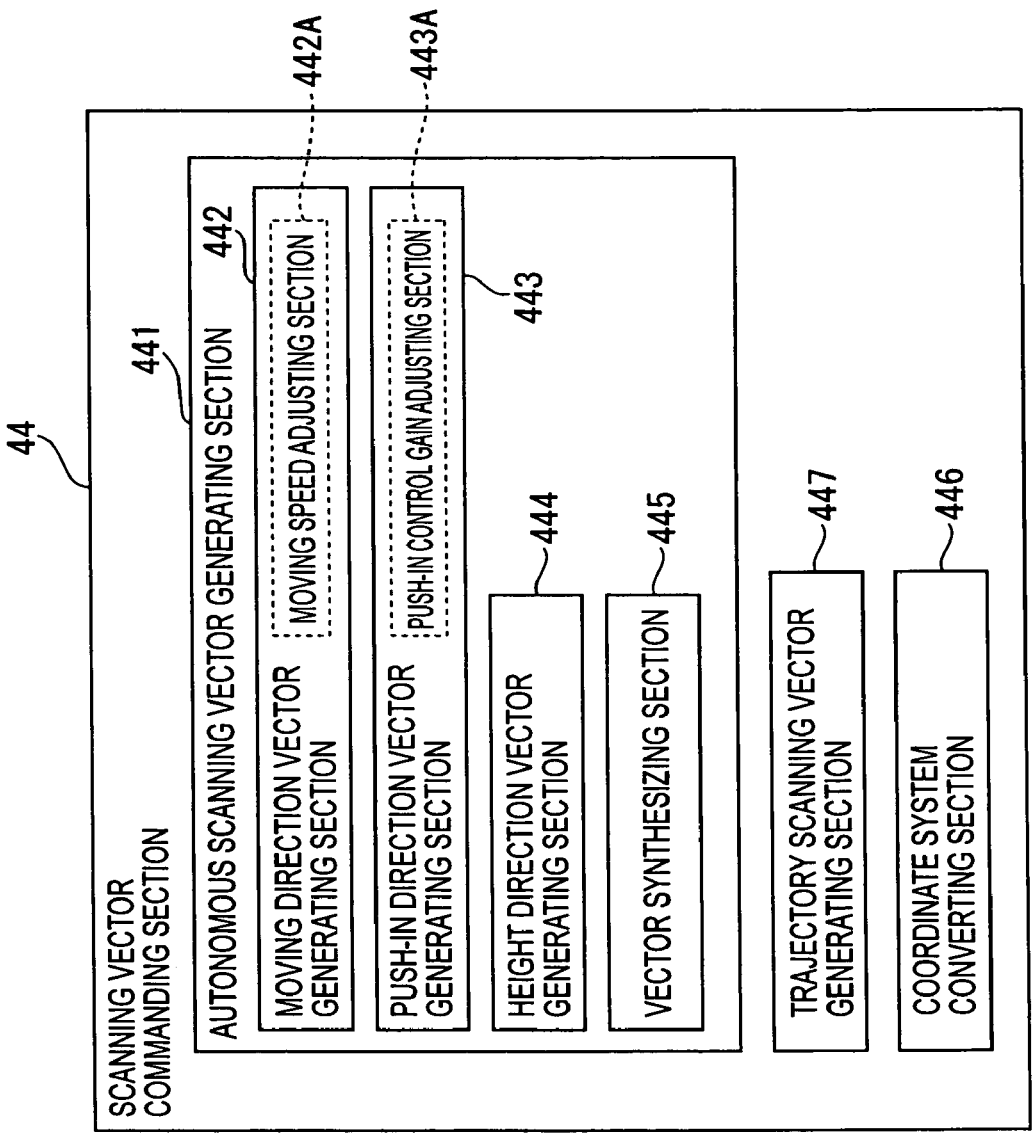
FIG. 18 is a schematic illustration showing the configuration of a scanning vector commanding section according to the second embodiment.

The motion controller 4 includes a scanning vector commanding section 44, which scanning vector commanding section 44 by turn includes a trajectory scanning vector generating section 447 as shown in FIG. 18.

The form data that are input to the measurement condition storage section 55 typically include design data of the workpiece W.

Figure 19:
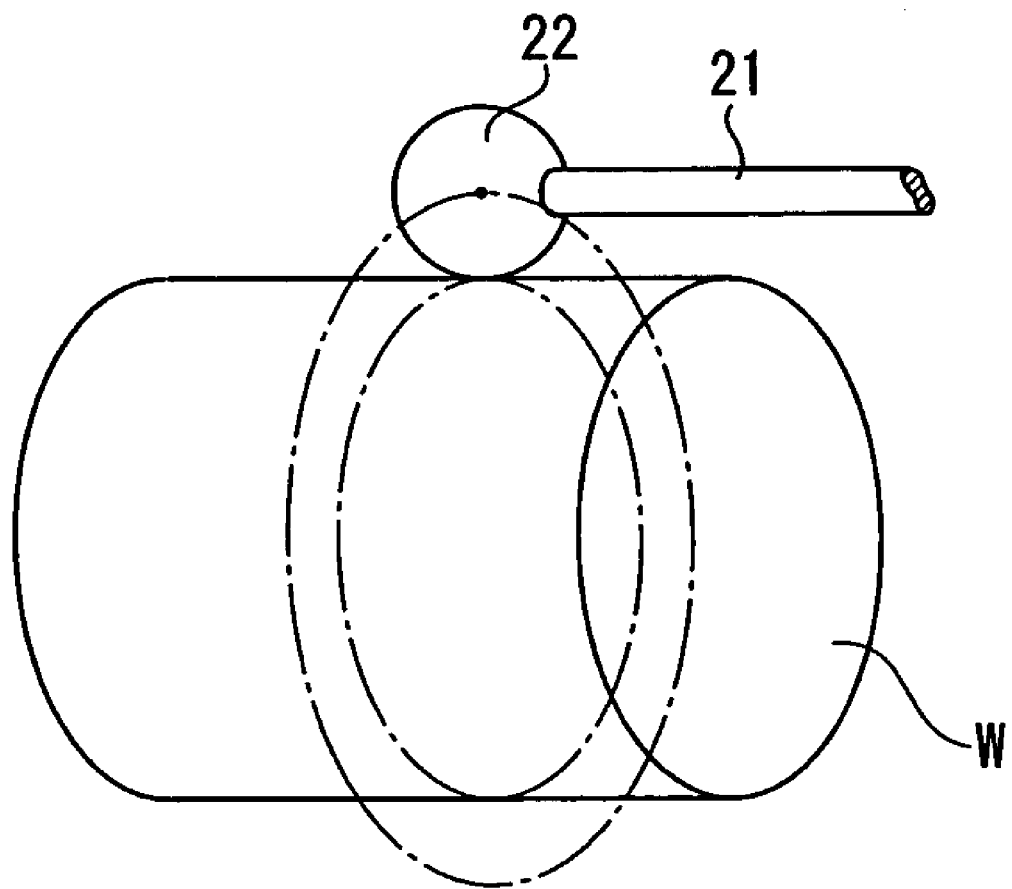
FIG. 19 is a schematic illustration showing how a trajectory is generated, according to the second embodiment.

The trajectory generating section 58 generates a trajectory for a scanning operation of the scanning probe 2 by way of computations of executing arithmetic processing operations on the basis of the design data of the workpiece W that are stored in the measurement condition storage section 55. FIG. 19 shows an exemplary trajectory generated by computations. Referring to FIG. 19, a trajectory is generated by computations in such a way that it is offset by the radius of the contact section 22 of the scanning probe 2 toward the direction of the normal line of the surface of the workpiece relative to the contour/form of the workpiece to be measured. Note, however, that the quantity of the offset may be equal to the radius of the contact section 22 of the scanning probe 2 or, alternatively, it may be equal to the apparent radius (measurement offset value) obtained by subtracting the reference push-in quantity from the radius of the contact section 22.

The trajectory generating section 58 generates a trajectory on a real time basis, reading the design data of several scanning points in advance while the scanning operation is going on. More specifically, the trajectory generating section 58 generates the trajectories by sequentially reading out the design data of the several scanning points that are lying ahead of the current scanning point from the design data stored in the measurement condition storage section 55. The generated trajectories are output to the scanning vector commanding section 44.

The trajectory scanning vector generating section 447 generates a vector for moving the scanning probe 2 along the trajectory generated by the trajectory generating section 58. The vector is used to move the scanning probe 2 at the moving speed decided by the measurement condition deciding section 54 as in the case of the first embodiment.

The error judging section 51 judges if the push-in quantity of the scanning probe 2 is within the predetermined threshold value or not according to the output value of the probe counter 415 (marginal comparison/judgment) as in the case of the first embodiment. If the error judging section 51 makes an error judgment, the mode shift command section (measurement mode switching section) 512 outputs a mode shift command to the scanning vector commanding section 44. When the scanning vector commanding section 44 receives a mode shift command, the operation of the trajectory scanning vector generating section 447 is stopped and the autonomous scanning vector generating section 441 is made to start operating so that an autonomous scanning operation is conducted.

Figure 20:
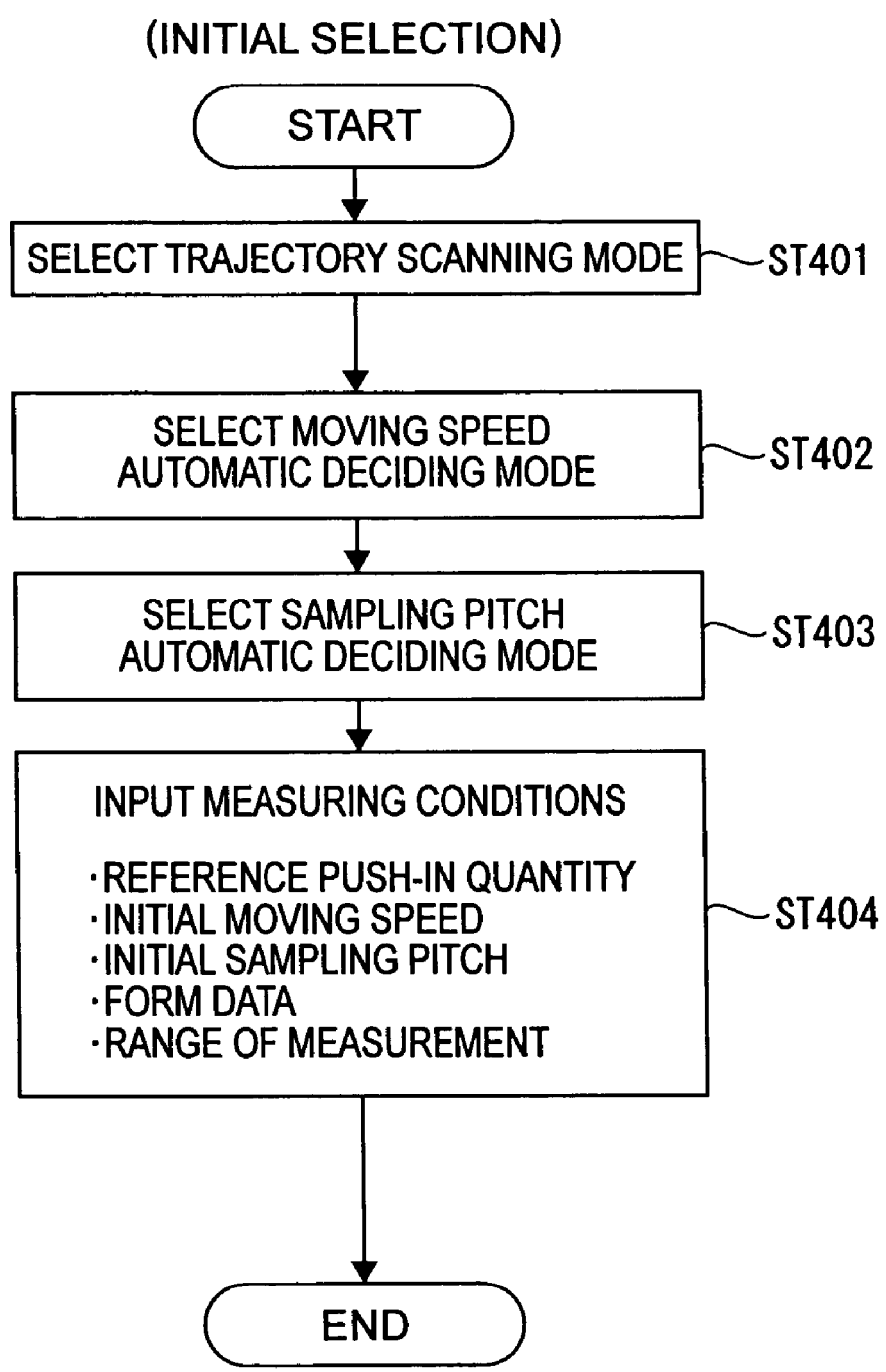
FIG. 20 is a flow chart showing the sequence of an initial selection process according to the second embodiment.

The surface scan measuring method of the second embodiment will be described by referring to the flow charts of FIGS. 20 and 21. The surface scan measuring method of the second embodiment is similar to that of the first embodiment and includes an initial selection step (ST100), a scan measuring step (ST200) and a form analyzing step (ST300) as described above with reference to FIG. 11. FIG. 20 is a flow chart of the initial selection step of the second embodiment. Referring to FIG. 20, firstly in ST401, a trajectory scanning mode is selected. Subsequently, an automatic moving speed deciding mode (ST402) and an automatic sampling pitch deciding mode (ST403) are selected. Then, because the trajectory scanning mode is selected (ST401), design data (form data) of the workpiece W are input in the measurement condition input step of ST404.

Now, the scan measuring step will be described by referring to the flow chart of FIG. 21.

Firstly, in ST501, the scanning probe is made to approach the workpiece and start a scan measuring operation. Then, in ST502, the trajectory generating section 58 reads out form data from the measurement condition storage section 55 in advance and, in ST503, a trajectory is generated and the generated trajectory is output to the scanning vector commanding section 44.

In ST504, a scanning operation is carried out by the scanning probe 2 according to the trajectory scanning vector generated by the trajectory scanning vector generating section 447. In the initial stages, the scanning probe 2 moves for the scanning operation at the initial moving speed stored in the measurement condition storage section 55 in advance.

The moving speed and the sampling pitch are decided (ST509 and ST510) on the basis of the control sampling points acquired in ST505 and the scanning operation is conducted along the trajectory scanning vector generated by the trajectory scanning vector generating section 447 (ST511). Then, an error judgment (ST513) and a judgment if the sampling pitch is met or not (ST514) are made and measurement sampling points are acquired (ST515). These steps are basically the same as their counterparts of the first embodiment.

If a negative decision is made on non-error in the error judgment step of ST513 (ST513: NO), the mode of the scanning operation is shifted to an autonomous scanning mode. In other words, the scanning operation does not follow the trajectory generated by the trajectory generating section 58 and an autonomous scanning operation (ST518) is conducted according to the autonomous scanning vector generated by the autonomous scanning vector generating section 441 (ST517). The autonomous scanning operation (ST518) is identical with the one described earlier by referring to the first embodiment.

After shifting to the autonomous scanning mode, it is possible to control the mode switching operation of deciding the time when the trajectory scanning mode is restored according to the outcome of the marginal comparison and determination of the error judging section (relative position determining section) 51. For example, the autonomous scanning mode may be switched back to the trajectory scanning mode when the state where the positional deviation exceeds the marginal positional deviation is dissolved and subsequently the width of fluctuations of the positional deviation per unit time or per unit distance is reduced to less than a predetermined value because it is safe to assume that the tracing performance of the scanning probe is excellent and hence the surface of the workpiece is relatively flat when the width of fluctuations of the positional deviation is small in an autonomous scanning mode. Then, it is safe to judge that the trajectory scanning operation can be conducted stably if the trajectory scanning mode is restored at the scanning position.

The above-described second embodiment provides the following advantages in addition to the above listed advantages (2), (3), (5), (6), (7) and (8).

(9) A trajectory is generated on the basis of the form data read out in advance by the trajectory generating section 58 and the scanning operation is conducted along the trajectory. Thus, it is not necessary to computationally frequently determine the moving direction and the push-in direction if compared with an autonomous scanning operation and hence the scanning operation can be conducted at high speed. Additionally, the change in the radius of curvature (surface condition) of the surface of the workpiece can be predicted by seeing the trajectory generated by the trajectory generating section 58 and hence it is possible to prevent errors such as excessive push-in and breakaway of the scanning probe 2 from taking place.

(10) While the scanning operation is conducted along the trajectory generated by the trajectory generating section 58, the moving speed and the sampling pitch are adjusted incessantly by the measurement condition deciding section 54. Thus, the scanning operation is conducted at a moving speed and a sampling pitch that match the actual surface of the workpiece.

(11) When an error such as excessive push-in or breakaway of the scanning probe 2 occurs, the mode of the scanning operation is shifted to an autonomous scanning mode according to the mode shift command from the mode shift commanding section 512. Thus, the scanning operation continues appropriately in an autonomous scanning mode if the actual form of the surface of the workpiece differs from the one indicated by the design data. In other words, a state of measurement impossible does not arise to the scanning probe 2 if an error such as excessive push-in or breakaway of the scanning probe 2 occurs in the course of a trajectory scanning operation and the trajectory scanning mode is restored to continue the scan measuring operation.

Third Embodiment

Now, the third embodiment of the present invention will be described below.

The third embodiment has a configuration that is basically the same as that of the second embodiment. However, the third embodiment differs from the second embodiment in that the trajectory generating section thereof includes a trajectory modifying section.

Figure 22:
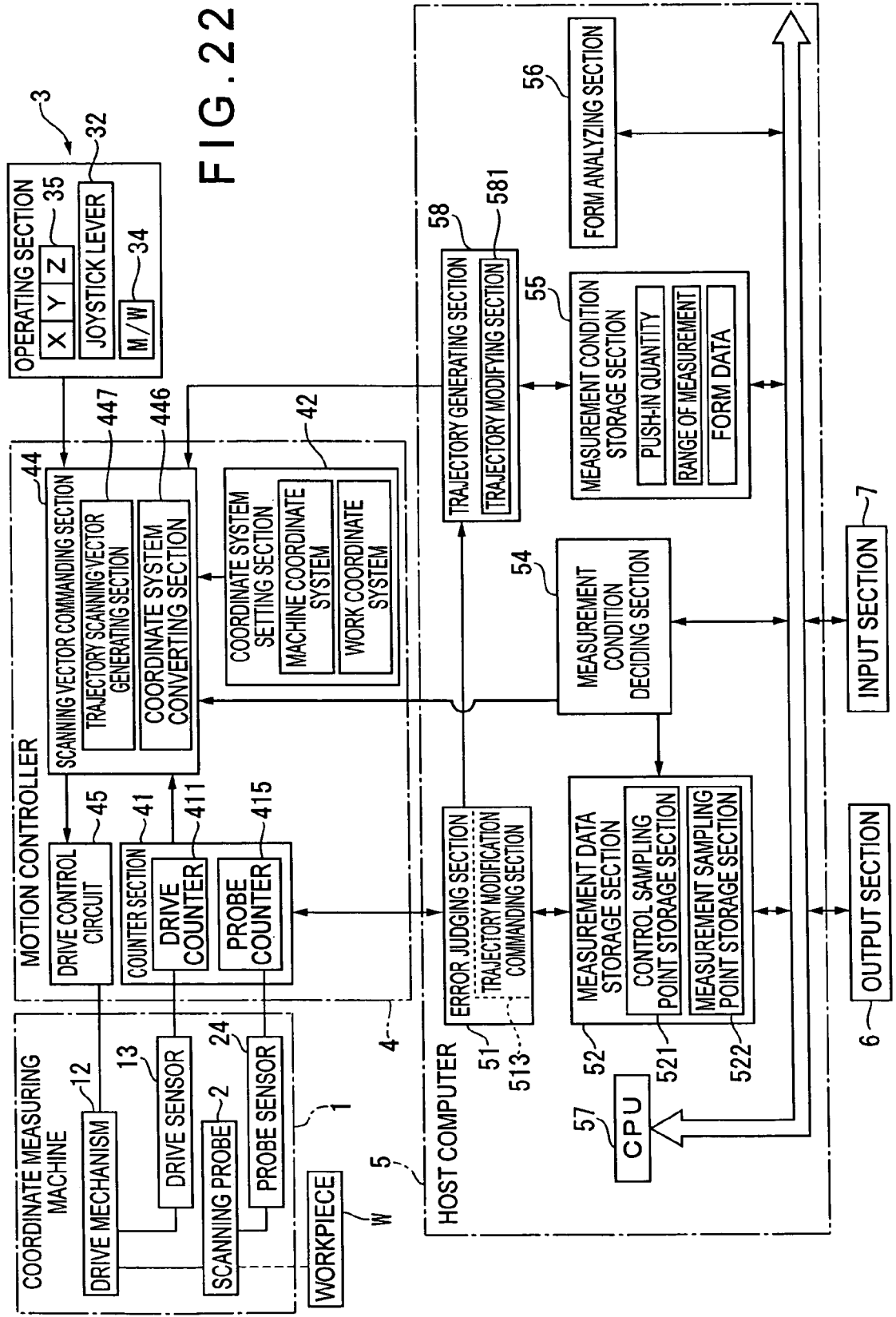
FIG. 22 is a block diagram showing the function of a measuring system according to a third embodiment of the present invention.

FIG. 22 is a functional block diagram of the third embodiment of the present invention. Referring to FIG. 22, the motion controller 4 includes a scanning vector commanding section 44, which scanning vector commanding section 44 by turn includes a trajectory scanning vector generating section 447 but does not include an autonomous scanning vector generating section. The error judging section (relative position determining section) 51 and the trajectory generating section 58 of the host computer 5 respectively include a trajectory modification commanding section (measurement mode switching section) 513 and a trajectory modifying section 581.

The trajectory modification commanding section 513 outputs a trajectory modification command to the trajectory generating section 58 when the error judging section 51 makes an error judgment. Upon receiving the trajectory modification command, the trajectory modifying section 581 modifies the trajectory (predetermined route) generated by the trajectory generating section 58 according to the shortage or the excess of the push-in quantity when the error judgment is made. When modifying the trajectory, the offset in the normal line direction relative to the contour/form of the workpiece that is used for generating the trajectory may be adjusted.

Figure 23:
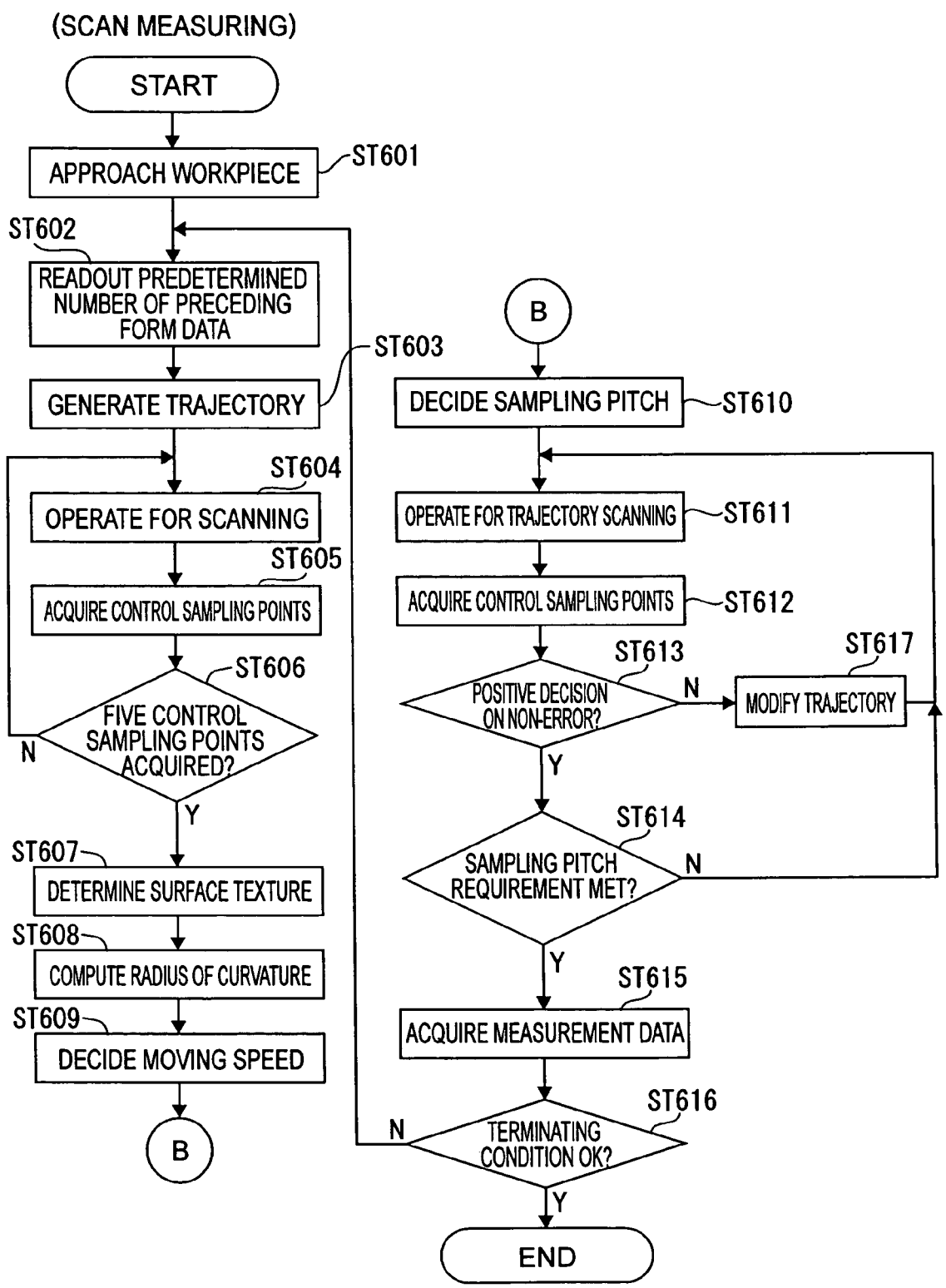
FIG. 23 is a flow chart showing the sequence of a scan measuring process according to the third embodiment.

FIG. 23 is a flow chart of the surface scan measuring operation of the third embodiment, using the surface scan measuring method of the third embodiment. Since the sequence of operation of the third embodiment is basically similar to that of the above-described second embodiment, it will not be described here in detail.

Each control sampling point acquired by the trajectory scanning operation (ST611) is judged to be an error or not (ST613). If a negative decision is made on non-error (ST613: NO), the trajectory is modified by the trajectory modifying section in ST617. As the trajectory is modified, a trajectory scanning vector is generated by the trajectory scanning vector generating section 447 according to the modified trajectory.

Then, the scanning operation is continued according to the vector generated by the trajectory scanning vector generating section 447 (ST611).

The above-described third embodiment provides the following advantages in addition to the above listed advantages (2), (3), (5) through (10) of the preceding embodiments.

(12) The trajectory is modified by the trajectory modifying section 581 when an error judgment is made. More specifically, the trajectory is appropriately modified and the trajectory scanning operation is continued when the actual form of the workpiece partly differs from the one indicated by the design data of the workpiece. Thus, the scanning operation continues, maintaining the high speed thereof, to reduce the time required for the measuring operation. If an error judgment is made, the trajectory is modified according to the excess or the shortage of the push-in quantity of the scanning probe 2 so that the scanning probe 2 will be hardly damaged by errors such as an excessive push-in and breakaway from the surface of the workpiece and the measuring operation proceeds smoothly.

The present invention is by no means limited to the above-described embodiments, which may be altered and modified in various different ways within the scope of the present invention.

For example, while the current value of the moving speed and that of the sampling pitch are determined as values of measurement parameters and adjusted according to the outcome of the judgment on the surface condition of the workpiece in the first embodiment (FIGS. 3 and 8), the present invention is by no means limited thereto. In other words, for example, the scanning control parameters such as the push-in control gain and the various servo control parameters such as the servo control gain that are set in the drive control circuit 45 may be determined and adjusted according to the outcome of the judgment on the surface condition of the workpiece. Additionally, parameters such as the reference position for pushing in the scanning probe and the marginal positional deviation may also be modified.

While the measurement parameters are determined and adjusted according to the outcome of the judgment on the surface condition of the workpiece in the above-described embodiments, the present invention is by no means limited thereto and adaptive measurement control conditions may be determined for the measurement parameters and the control parameters without referring to the outcome of the judgment on the surface condition.

For example, referring to FIG. 3, the measurement parameters and the control parameters may be determined and adjusted according to the positional deviation as determined by the error judging section (relative position determining section) 51. If such is the case, the scanning/tracing performance of the scanning probe is improved by reducing the moving speed and/or increasing the scanning control gain and the servo control gain when the absolute value of the positional deviation exceeds a predetermined value. Thus, it is easy to maintain the relative position within a predetermined range that is centered at the reference position. To the contrary, the moving speed may be increased and the scanning control gain and the servo control gain may be reduced when the absolute value of the positional deviation is found below the predetermined value. With this arrangement, it is possible to prevent an abnormal state of excessive push-in or insufficient push-in of the scanning probe relative to the surface of the workpiece or that of breakaway of the scanning probe from the surface of the workpiece from taking place. Then, the scanning operation can be conducted stably at high speed.

While the relationship of various surface conditions and various parameters and/or the relationship of the positional deviation and various parameters are defined in reference tables or as functional relationships when determining adaptive measurement control conditions of measurement parameters and control parameters according to the outcome of the judgment on the surface condition of the surface condition determining section and/or the outcome of the judgment on the positional deviation of the relative position determining section in the above-described embodiments, the present invention is by no means limited thereto and any of the reference tables and the functional relationships may be modified appropriately. For example, when adjusting the moving speed according to the outcome of the judgment on the surface condition, the related reference table may be rewritten so as to further reduce the moving speed in order to make it correspond to the surface condition if the positional deviation is not stabilized after the elapse of a predetermined time period. For example, when the scanning control gain is defined as adjustment parameter according to the surface roughness, the related reference table may be rewritten so as to switch the adjustment parameter from the scanning control gain to the servo control gain if the positional deviation is not stabilized.

While both the moving speed and the sampling pitch are automatically decided in the above-described embodiments, the moving speed automatic deciding mode may not be selected (OFF) and/or the sampling pitch automatic deciding mode may not be selected (OFF). If such is the case, the scanning operation is conducted at a specified speed and/or at a specified pitch.

Figure 24:
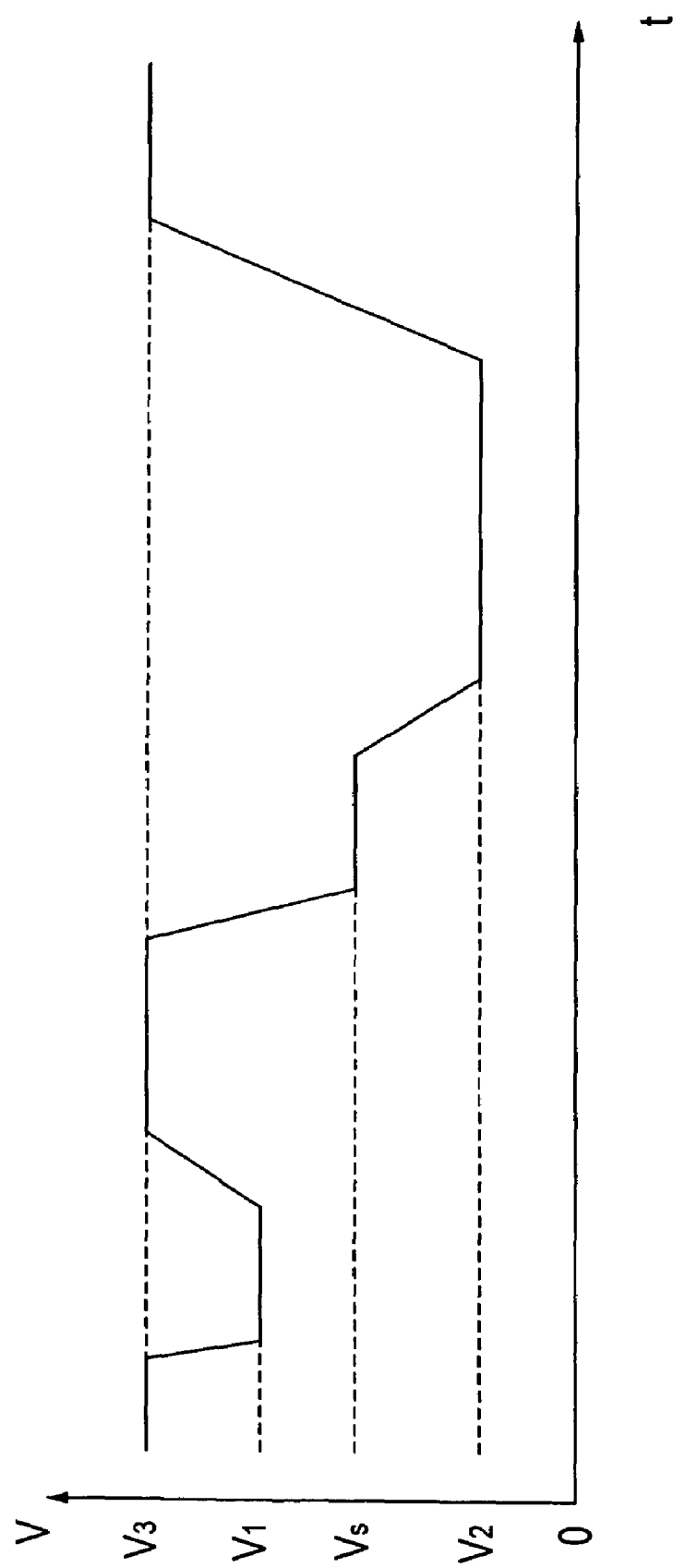
FIG. 24 is a schematic illustration showing a process of changing the moving speed of the scanning probe stepwise.

In the above-described embodiment, the scanning operation is conducted at the moving speed decided by the moving speed deciding section 544 and hence the moving speed will be changed abruptly to give rise acceleration to a large extent at a point where the radius of curvature of the surface of the workpiece changes abruptly. Therefore, when the moving speed is changed, it may be changed mildly to a certain extent as shown in FIG. 24. The processing operation necessary for it may be carried out by the moving direction vector generating section 442 in such a way that the moving speed that is defined immediately before is gradually changed to the moving speed that is defined next. A smoother acceleration (deceleration) can be realized when the moving speed is changed to show an S-shape.

The moving speed may also be changed gradually when judging if the scanning point is located inside or outside a specified region and the moving speed is switched to the speed specified in advance because the scanning point is judged to be located in the inside of the specified region. Similarly, the moving speed may be gradually changed from the specified speed when the scanning point is judged to be moving from the inside to the outside of the specified region.

While the moving speed deciding section 544 is equipped with a moving speed reference table 545 and the sampling pitch deciding section 546 is equipped with a sampling pitch reference table 547 in the above-described embodiments, alternatively, the moving speed deciding section 544 and the sampling pitch deciding section 546 may respectively compute the moving speed and the sampling pitch by means of predetermined arithmetic formulas, using the radius of curvature.

While the moving speed reference table 545 stores moving speeds for different radii of curvature and the sampling pitch reference table 547 stores sampling pitches for different radii of curvature in the above-described embodiments, it may alternatively be so arranged that the moving speed reference table 545 stores speed adjusting coefficients for different radii of curvature and the sampling pitch reference table 547 stores sampling pitch adjusting coefficients for different radii of curvature. Then, the moving speed and/or the sampling pitch are adjusted according to the radius of curvature by multiplying the reference moving speed and/or the reference sampling pitch by the corresponding moving speed adjusting coefficient and/or the corresponding sampling pitch adjusting coefficient.

While the push-in control gain adjusting section 443A adjusts the coefficient $V_e$ of the push-in direction vector when adjusting the control gain for the push-in direction in the above description, the arrangement for adjusting the gain is not limited thereto and may be modified in various different ways. For example, while adjusting the coefficient $V_e$ of the push-in direction vector corresponds to adjusting the position feedback gain for the positional deviation ($|E|-E_0$), the gain of the speed control loop and/or that of the electric current control loop of the drive control circuit 45 may alternatively be adjusted.

Figure 13:
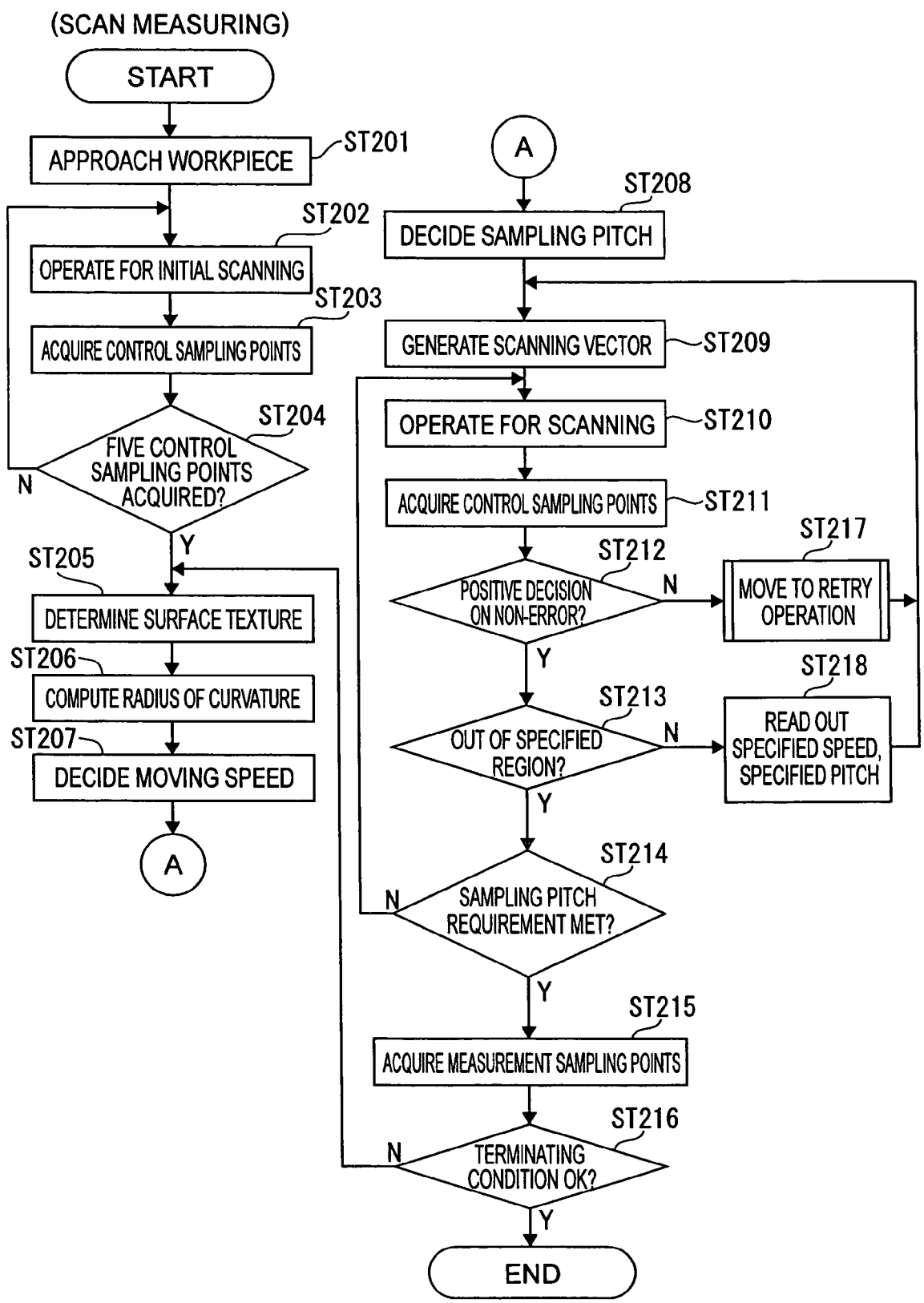
FIG. 13 is a flow chart showing the sequence of a scan measuring process according to the first embodiment.

While the number of retries of ST217 in FIG. 13 is not limited in the above-described embodiments, it may be limited to a predetermined value and it may be so arranged that an alarm is output and the measuring operation is suspended when the predetermined number is exceeded.

Figure 21:
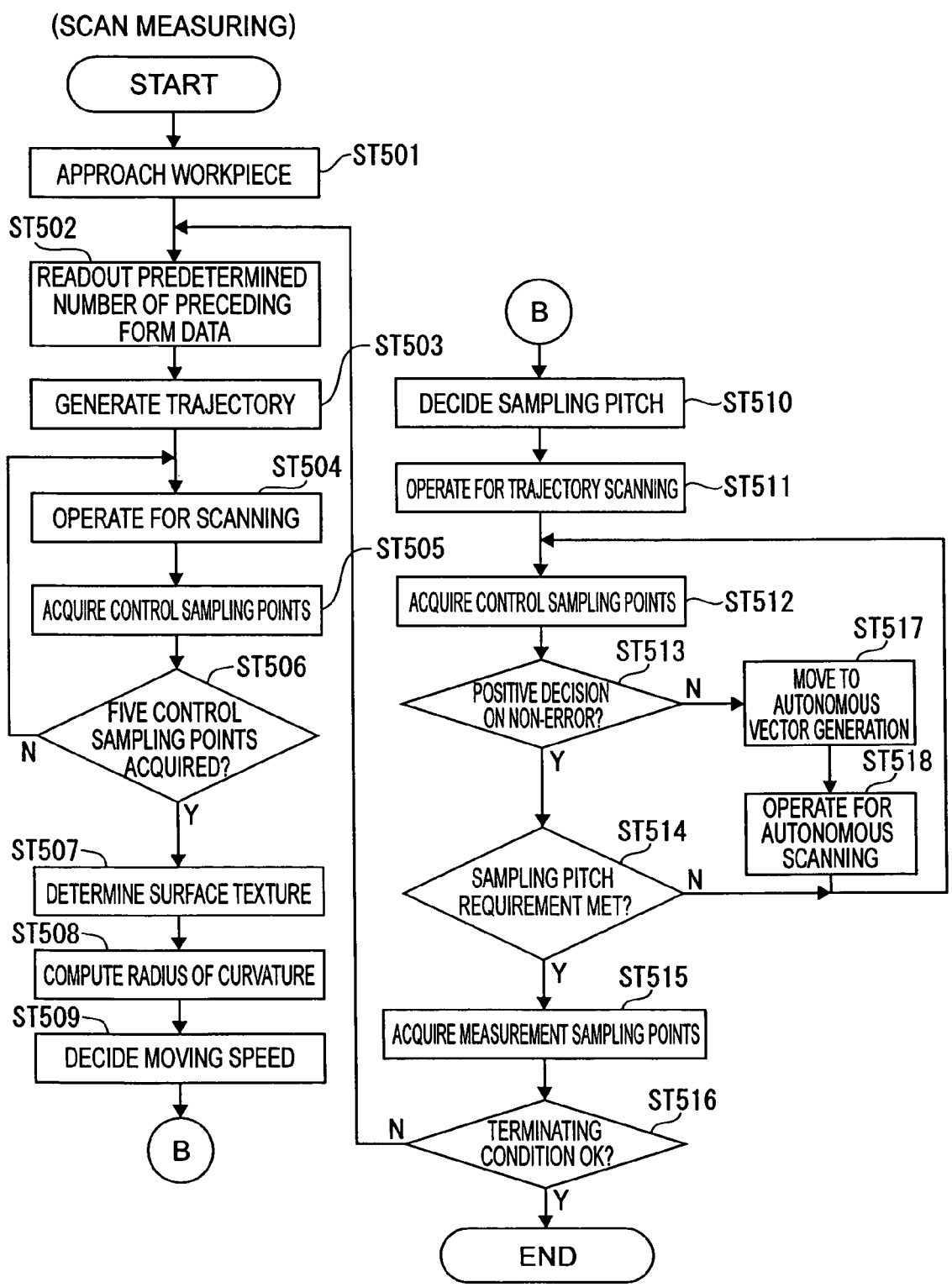
FIG. 21 is a flow chart showing the sequence of a scan measuring process of the second embodiment.

An autonomous scanning operation is started when an error judgment is made in ST513 in a trajectory scanning operation in the above description of FIG. 21, it may be so arranged that the autonomous scanning operation is switched back to the trajectory scanning operation when a positive decision is made on non-error after the elapse of a predetermined period of time or for a predetermined number of times.

While the operation of removing the noises contained in the measurement data is not described in the above description, it may be needless to say that any of various known noise removing process and/or noise smoothing process may be carried out for the purpose of the present invention.

The principle of measurement operation of the scanning probe is not limited for the purpose of the present invention. In other words, a contact type probe using an analog or digital type detection sensor or a non-contact type probe using an acoustic type, an electrostatic capacitance type, an electromagnetic induction type or an optical type detection sensor may be used for the purpose of the present invention.

While a measuring device equipped with a detection sensor is driven to move relative to the workpiece along the latter so as to scan and measure the surface of the workpiece in the above description, the present invention is by no means limited thereto. In other words, it is not necessary to relatively move the measuring device along the surface of the workpiece provided that the scanning probe can measure the surface texture (such as contour, form, circularity, waviness, roughness) of the workpiece.

The configuration of scanning probe is not limited to the above description. In other words, a scanning probe having a strain gauge for detecting the strain of the stylus or a non-contact type probe adapted to detect the surface of a workpiece without contacting it may alternatively be used for the purpose of the present invention.

The priority application Number JP2004-161607 upon which this patent application is based is hereby incorporated by reference.

What is claimed is:

1. A surface scan measuring device, comprising:
a scanning probe having a detecting section for detecting the relative position of the detecting section relative to a surface of a workpiece along a normal line direction of the surface of the workpiece, the scanning probe being adapted to scan the surface of the workpiece in a condition where the relative position of the detecting section relative to the surface of the workpiece is maintained within a predetermined range centered at a predefined reference position;
a moving section for moving the scanning probe;
a measurement data storage section for sampling an output of the detecting section and a drive quantity of the moving section at a predetermined sampling pitch and storing the sampled data as measurement data;
a measurement condition deciding section including a surface condition determining section for determining a surface condition of the workpiece according to the measurement data, the measurement condition deciding section being adapted to decide, according to the determined surface condition, an adaptive measurement control condition by determining or adjusting at least one of measurement parameters, that include a moving speed for moving the scanning probe and the sampling pitch, and control parameters, that include control gains;
a scanning vector commanding section for issuing a scanning vector command for moving the scanning probe according to the moving speed;
a drive control section for driving and controlling the moving section according to the scanning vector and the control parameters;
a measurement condition storage section for storing: a specified region defined and input in advance; and at least one of the measurement parameters and the control parameters as measurement conditions in the specified region; and
a specified region judging section for judging whether or not a current scanning point of the scanning probe is in the specified region, wherein
when the current scanning point is judged to be in the specified region by the specified region judging section, the scanning vector commanding section is adapted to issue the scanning vector command according to the at least one of the parameters stored in the measurement condition storage section while the measurement data storage section samples the measurement data according to the at least one of the parameters stored in the measurement condition storage section.

2. The device according to claim 1, wherein
the surface condition refers to at least one of a surface direction changing rate, a radius of curvature, roughness and waviness of the surface of the workpiece that extends along the moving direction of the scanning probe.

3. The device according to claim 1, further comprising:
a relative position determining section for judging a positional deviation of the relative position relative to the reference position; and
a measurement mode switching section for switching a measurement mode according to the judgment by the relative position determining section.

4. The device according to claim 3, wherein
the relative position determining section further compares the positional deviation and a predetermined threshold and judges a difference therebetween; and
the measurement mode switching section puts back the scanning probe to a position of past measurement data stored in the measurement data storage section and modifies at least one of the measurement parameters and the control parameters according to the judgment by the relative position determining section.

5. The device according to claim 3, further comprising:

a trajectory generating section for generating a predetermined route of scanning according to form data of the workpiece input in advanced, wherein the scanning vector commanding section includes: an autonomous scanning vector generating section for automatically generating a next scanning vector according to the relative position at the current time point; and a trajectory scanning vector generating section for generating a scanning vector for the scanning probe to scan along the predetermined route generated by the trajectory generating section, the relative position determining section is adapted to further compare the positional deviation and a predetermined threshold and judge a difference therebetween, and the measurement mode switching section is adapted to control switching between trajectory scanning using the trajectory scanning vector generating section and autonomous scanning using the autonomous scanning vector generating section according to the judgment by the relative position determining section.

6. The device according to claim 3, further comprising:

a trajectory generating section for generating a predetermined route of scanning according to form data of the workpiece input in advanced, wherein the scanning vector commanding section includes a trajectory scanning vector generating section for generating a scanning vector for causing the scanning probe to scan along the predetermined route generated by the trajectory generating section, the relative position determining section is adapted to further compare the positional deviation and a predetermined threshold and judge a difference therebetween; and the measurement mode switching section is adapted to modify the predetermined route according to the judgment by the relative position determining section.

7. The device according to claim 3, wherein the measurement mode switching section adjusts at least one of the measurement parameters and the control parameters according to the positional deviation.

8. The device according to claim 1, wherein the measurement condition deciding section adjusts the control parameters according to the moving speed.

* * * * *